(12) United States Patent
Wall et al.

(10) Patent No.: US 7,369,950 B2
(45) Date of Patent: May 6, 2008

(54) SYSTEM AND METHOD FOR POWER QUALITY ANALYTICS

(75) Inventors: Daniel J. Wall, Saanichton (CA); Jeffery W. Johnson, Victoria (CA); Marcus Gasper, Salt Spring Island (CA); Stephen S. Kuperman, Sugar Land, TX (US); Douglas S. Ransom, Victoria (CA)

(73) Assignee: Power Measurement Ltd., Saanichton, B.C. (CA)

( * ) Notice: Subject to any disclaimer, the term of this patent is extended or adjusted under 35 U.S.C. 154(b) by 78 days.

(21) Appl. No.: 11/113,728

(22) Filed: Apr. 25, 2005

(65) Prior Publication Data

US 2005/0273281 A1 Dec. 8, 2005

Related U.S. Application Data

(63) Continuation-in-part of application No. 10/775,761, filed on Feb. 9, 2004.

(60) Provisional application No. 60/445,788, filed on Feb. 7, 2003, provisional application No. 60/445,881, filed on Feb. 7, 2003.

(51) Int. Cl.
 *G06F 19/00* (2006.01)
(52) U.S. Cl. .......................... 702/60; 702/57
(58) Field of Classification Search .................. 702/57, 702/60
See application file for complete search history.

(56) References Cited

U.S. PATENT DOCUMENTS

| | | | |
|---|---|---|---|
| 4,261,037 A | 4/1981 | Hicks | 364/464 |
| 5,627,759 A * | 5/1997 | Bearden et al. | 702/62 |
| 5,758,331 A | 5/1998 | Johnson | 705/412 |
| 5,825,656 A * | 10/1998 | Moore et al. | 702/60 |
| 7,050,916 B2 * | 5/2006 | Curtis et al. | 702/81 |
| 2002/0018545 A1 | 2/2002 | Crichlow | |
| 2004/0138835 A1 | 7/2004 | Ransom | 702/62 |

FOREIGN PATENT DOCUMENTS

GB 2148565 A 10/1983

OTHER PUBLICATIONS

Sezi, T; Duncan, B: "New Intelligent Electronic Devices Change the Structure of Power Distribution"; 34th Annual IEEE Industry Applications Conference; vol. 2; Oct. 3-7, 1999; pp. 944-952.*
PCT International Search Report PCT/IB2004/000720.
WebGen Systems, Presentation—WebGen's Intelligent Use of Energy (IUE)™ System, http://www.webgensystems.com/mktportal/index.htm, 32 pages, © 2001 WebGen, Inc.

(Continued)

*Primary Examiner*—John E. Barlow, Jr.
*Assistant Examiner*—Douglas N Washburn
(74) *Attorney, Agent, or Firm*—Brinks Hofer Gilson Lione

(57) ABSTRACT

A power quality analysis system includes a combination of at least one of a power quality parameter value, power quality event properties, non-power quality properties, and time properties. The parameter value and other properties is used to create power quality information that is descriptive of power quality events. The power quality information is easily configured and organized based on the desired options in order to make it more understandable and usable.

42 Claims, 20 Drawing Sheets

OTHER PUBLICATIONS

Open Advancing Substation Automation, Kreiss Johnson, available at http://www.kjt.com/pdf/u_Datasheet.pdf, 13 pages, © 2003 Kreiss Johnson Tech., Inc.

Kreiss, David. Utility Automation, Global Energy Solutions, available at http://www.kjt.com/pdf/092003_Non-operational-data.pdf, 4 pages, © 2003 Kreiss Johnson Tech., Inc.

Kreiss, David. Utilities Can Enhance Bottom-Line by Leveraging Non-Operational Data, available at http://www.kjt.com/pdf/092003_Non-operational-data.pdf, 4 pages, © 2003 Kreiss Johnson Tech., Inc.

Enerwise Global Technologies—Enerwise Options Alarming & Notification and Cost Estimation, 2 pages, http://www.enerwise.com/docs/, Pennsylvania, Sep. 16, 2002.

Data Loggers & Profile Loggers Sub-Metering Systems kWh Meters & Multi-Parameter Meters Energy & Power Quality Analysers Power Factor Correction, MeterRing™2000 Software. Copyright 2001, 3 pages.

Eka Systems, Inc., Reliable wireless sensor and control networks, Product Specification, Energy Insight™, 2 pages, Maryland, Aug. 22, 2002.

Automated Energy News Brief, 2 pages, Oklahoma, © Automated Energy Inc. 2003.

Application Brief, Circadian Information Systems: Circadian Integrates Pi™ With EnterpiseOne™, 6 pages, http://www.circadianinfosystems.com/. © 2000 Circadian Information Systems.

RSEnergyMetrix, Technical Data, Rockwell Software, 4 pages, www.software.rockwell.com, www.rockwellautomation.com, Wisconsin, © 2002 Rockwell Software Inc.

Allen-Bradley, Your Solution for Power & Energy Management, Rockwell Automation, 9 pages, © 19xx Rockwell International Corporation, Jan. 2000.

Energy Profiler Online™ Energy Insight for Your Most Valuable Customers, 2 pages, ABB Inc., www.abb,com Califronia, © 2001 ABB Inc.

Engagenetworks, eBilling [Electronic Billing], 2 pages, www.engagenet.com, Wisconsin, © engagenetworks, copyright 2000, 2001.

Lodestar RateExpert® Reduce Cost with Advanced Rate Analysis, www.lodestarcorp.com, 2 pages, United States, United Kingdom, Australia, Copyright © 2003.

SAIC, News Release, SAIC's Enerlink Division Announces Latest Generation of BillGen®, Complex Billing Engine, http://www.saic.com/, 2 pages, Georgia, May 24, 1999.

FAQs for Metrix, What does Metrix do? 9 pages, Jun. 17, 2003.

Meter, monitor, act, real-time decision about your utility purchases, use and costs, Envision™ turn data into decisions, http://envision.opg.com, 5 pages, © 2001 Ontario Power Generation Inc. Mar. 2002.

Lodestar Financial Management Extension™ v3.5, Accelerate your Cashflow, www.lodestarcorp.com, 2 pages, United States, United Kingdom, Australia, Copyright © 2003.

Lodestar BillingExpert® v3.5, If You Can Sell It, We Can Bill It, www.lodestarcorp.com, 2 pages, United States, United Kingdom, Australia, Copyright © 2003.

Excelergy® Product Overview, 3 pages, Massachusetts, Jun. 20, 2003.

OntarioPower Generation, Energy Solutions, Envision FAQ, 6 pages, Jun. 20, 2003.

Energetics Media Kit, www.energetics.com.au, www.envinta.com, 20 pages, Australia, USA, UK, Energetics Pty Ltd—Mar. 2003.

Oarsman Corporation, Simple Screen Organization, 2 pages, Jun. 17, 2003.

Stark, Energy Information Systems, Stark Essentials—Entry-level Monitoring & Targeting software for multi-site organisations, Stark RT—Energy information using directly collected data, Stark EA—Energy Accounting for analysing information on utility bills and manual meter readings, Stark SHM—Metering systems & high quality data loggers, Stark Online—Easy Reporting on all your utility supplies; 2 pages, Jun. 20, 2003.

Stark, Energy Information Systems, Products, Monitoring & Targeting software for multi-site organizations, Energy Information using directly collected data, Energy Accounting for analysing Information on utility bills and manual meter reading SHM Metering systems & high quality data loggers, 3 pages, Jun. 20, 2003.

Class 3000, POWERLOGIC® Engineered Solutions Billing Module, http://www.powerlogic.com, 2 pages, Square D, Schneider Electric, Tennessee, © 1999.

Bentek Energy, LLC Launch ETA, RateMiner Energy Tariff, Solutions, 8 pages, Jun. 17, 2003.

Stark, Energy Information Systems, Stark Essentials—Entry-level Monitoring & Targeting software for multi-site organisations, Stark RT- Energy information using directly collected data, Stark EA—Energy Accounting for analysing information on utility bills and manual meter readings, Stark SHM—Metering systems & high quality data loggers, Stark Online—Easy Reporting on all your utility supplies; 3 pages, Jun. 20, 2003.

Silicon Energy, when it really matters . . . , Rate Engine, 1 page, Jun. 16, 2003.

Stark, Energy Information Systems, Products, Audit Trail, 2 pages, Jun. 20, 2003.

Stark, Energy Information Systems, Stark Essentials—Entry-level Monitoring & Targeting software for multi-site organisations, Stark RT- Energy information using directly collected data, Stark EA—Energy Accounting for analysing information on utility bills and manual meter readings, Stark SHM—Metering systems & high quality data loggers, Stark Online—Easy Reporting on all your utility supplies; 3 pages, Jun. 20, 2003.

Stark, Energy Information Systems, Stark Essentials—Entry-level Monitoring & Targeting software for multi-site organisations, Stark RT- Energy information using directly collected data, Stark EA—Energy Accounting for analysing information on utility bills and manual meter readings, Stark SHM—Metering systems & high quality data loggers, Stark Online—Easy Reporting on all your utility supplies; 3 pages, Jun. 20, 2003.

Silicon Energy, when it really matters . . . , Cost Analyst, 1 page, Jun. 16, 2003.

* cited by examiner

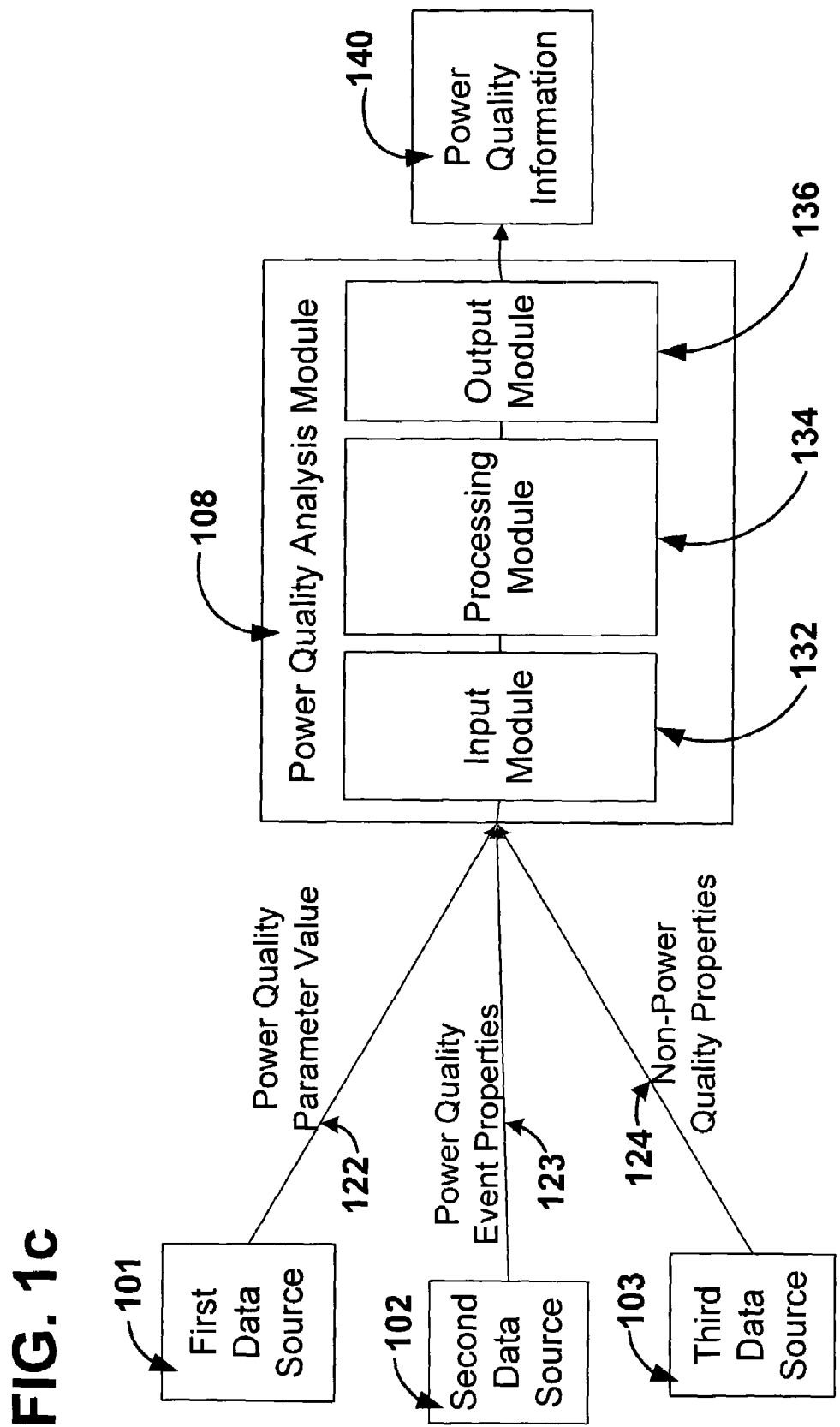

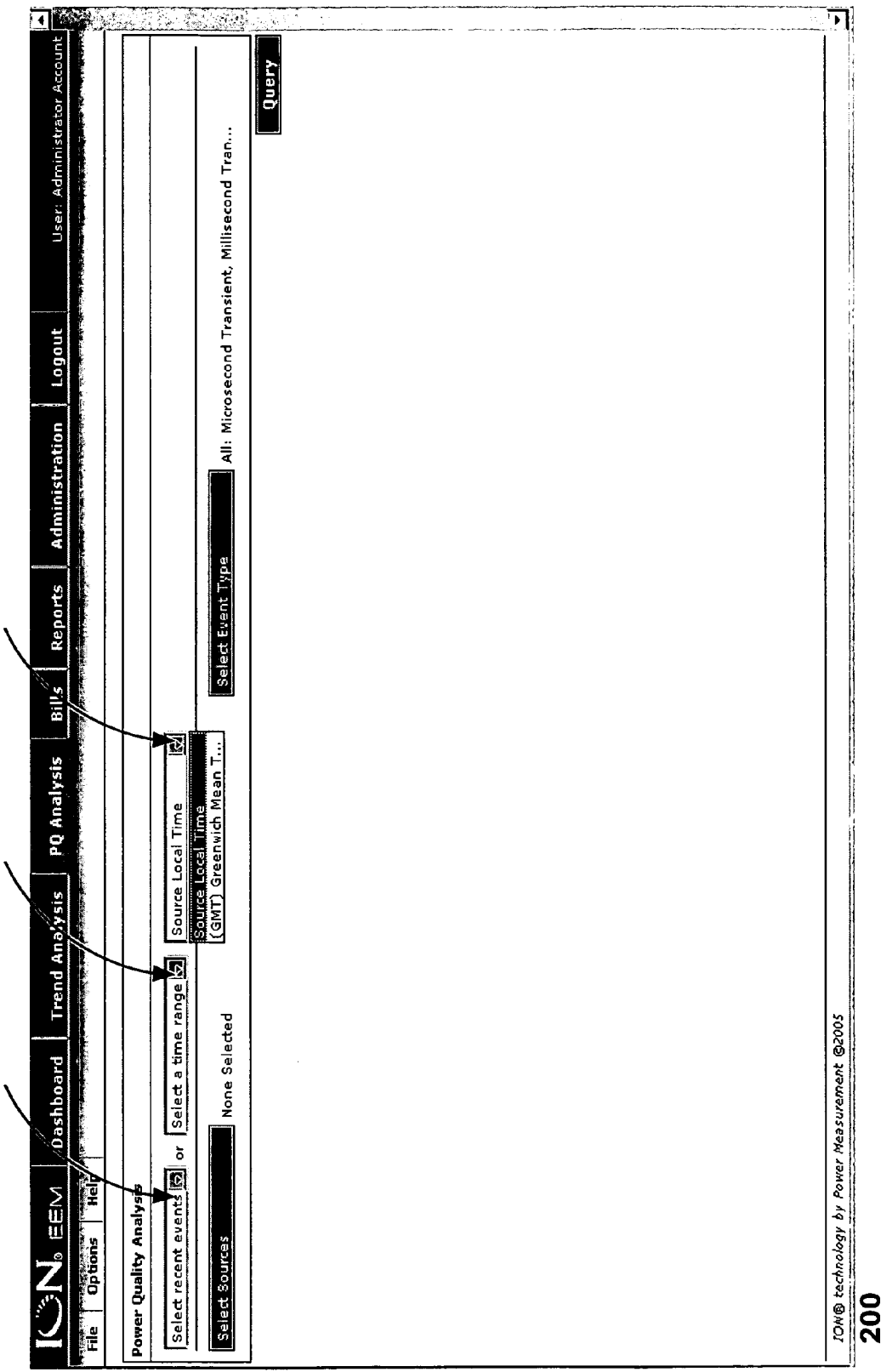

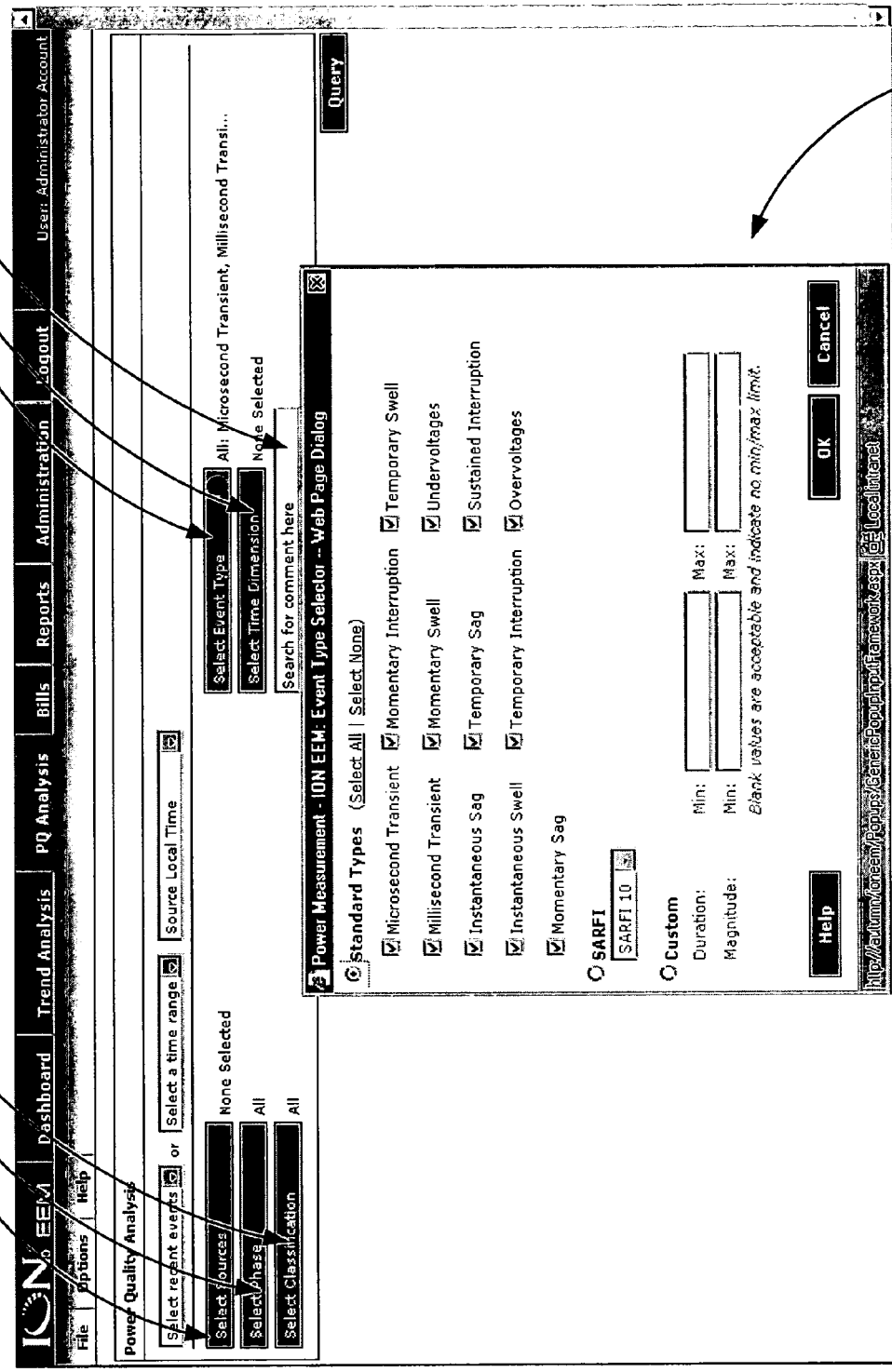

*Power Quality: Time Dimension Explorer*

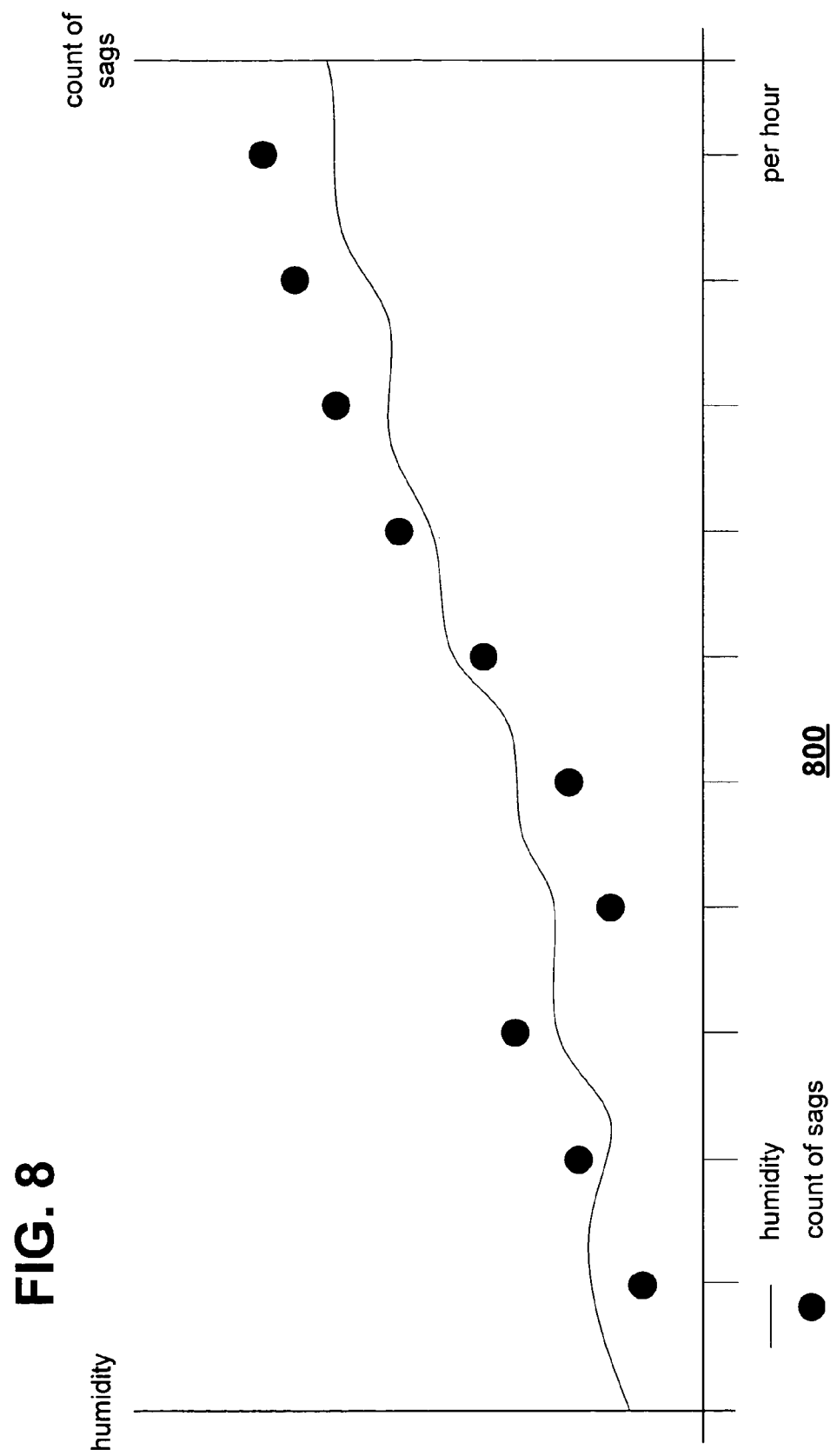

SYSTEM AND METHOD FOR POWER QUALITY ANALYTICS

RELATED APPLICATIONS

This application is a continuation-in-part under 37 CFR § 1.53(b) of U.S. application Ser. No. 10/775,761, entitled IDENTIFYING ENERGY DRIVERS IN AN ENERGY MANAGEMENT SYSTEM, filed Feb. 9, 2004, which is hereby incorporated by reference.

Application Ser. No. 10/775,761 claims the benefit under 35 U.S.C. § 119(e) of U.S. Provisional Application No. 60/445,788, entitled HUMAN-MACHINE INTERFACE FOR AN ENERGY ANALYTICS SYSTEM, filed Feb. 7, 2003, and U.S. Provisional Patent Application No. 60/445,881, entitled ENERGY ANALYTICS FOR AN ENERGY DISTRIBUTION SYSTEM, filed Feb. 7, 2003, which is related to U.S. patent application Ser. No. 10/340,374, entitled PUSH COMMUNICATIONS ARCHITECTURE FOR INTELLIGENT ELECTRONIC DEVICES, filed Jan. 9, 2003, which is a continuation-in-part under 37 CFR § 1.53(b) of U.S. patent application Ser. No. 09/896,570 (now U.S. Pat. No. 6,944,555), filed Jun. 29, 2001, which is a continuation-in-part under 37 CFR § 1.53(b) of U.S. patent application Ser. No. 09/814,436 (now U.S. Pat. No. 6,751,562), filed Mar. 22, 2001, which is a continuation-in-part under 37 CFR § 1.53(b) of U.S. patent application Ser. No. 09/723,564 (now U.S. Pat. No. 6,961,641), filed Nov. 28, 2000, and a continuation-in-part under 37 CFR § 1.53(b) of U.S. patent application Ser. No. 10/068,431 (now U.S. Pat. No. 6,694,270), filed Feb. 6, 2002, which is a continuation of U.S. patent application Ser. No. 08/798,723, filed Feb. 12, 1997, now abandoned, the entire disclosures of all of which are herein incorporated by reference.

BACKGROUND

Power quality problems cost billions of dollars a year to industry, corporations, government entities, as well as individuals. Manufacturing companies can suffer losses in the millions of dollars each time there is a power quality event. For corporations power quality events can cause computer problems and data loss. Existing power quality analysis tools are typically engineering-centric and are only capable of analyzing a single point of potential failure, thereby limiting the ease of use and value provided by the tool. Accordingly, there is a need for a tool that allows operators to understand relationships between power quality events across an enterprise.

BRIEF DESCRIPTION OF THE DRAWINGS

FIG. 1c depicts an overview of a power quality analysis module for use with the embodiment of FIG. 1a or 1b;

FIGS. 2a-2j depict exemplary screen displays generated by the power quality analysis system of FIG. 1a or 1c;

FIGS. 3a and 3b depict exemplary screen displays generated by the power quality analysis system of FIG. 1 or 2 based on user inputs;

FIG. 8 depicts an exemplary screen display showing trends in power quality outputted by the disclosed embodiments.

DETAILED DESCRIPTION OF THE PRESENTLY PREFERRED EMBODIMENTS

The disclosed embodiments relate to a Power Quality Analysis module implemented on a computer or other processor. The Power Quality Analysis module provides a multi-point system perspective that combines at least one power quality parameter value with at least one power quality event property, at least one non-power quality property, and, in at least one embodiment, wherein the at least one power quality event property and/or non-power quality event property may include at least one time property, to enable an analysis of power quality events and an understanding of the relationships between such events and other processes in a given power distribution system or portion thereof.

To clarify the use in the pending claims and to hereby provide notice to the public, the phrases "at least one of <A>, <B>, ... and <N>" or "at least one of <A>, <B>, ... <N>, or combinations thereof" are defined by the Applicant in the broadest sense, superseding any other implied definitions herebefore or hereinafter unless expressly asserted by the Applicant to the contrary, to mean one or more elements selected from the group comprising A, B, ... and N, that is to say, any combination of one or more of the elements A, B, ... or N including any one element alone or in combination with one or more of the other elements which may also include, in combination, additional elements not listed.

Inputs to the Power Quality Analysis Module

Figure 1A:
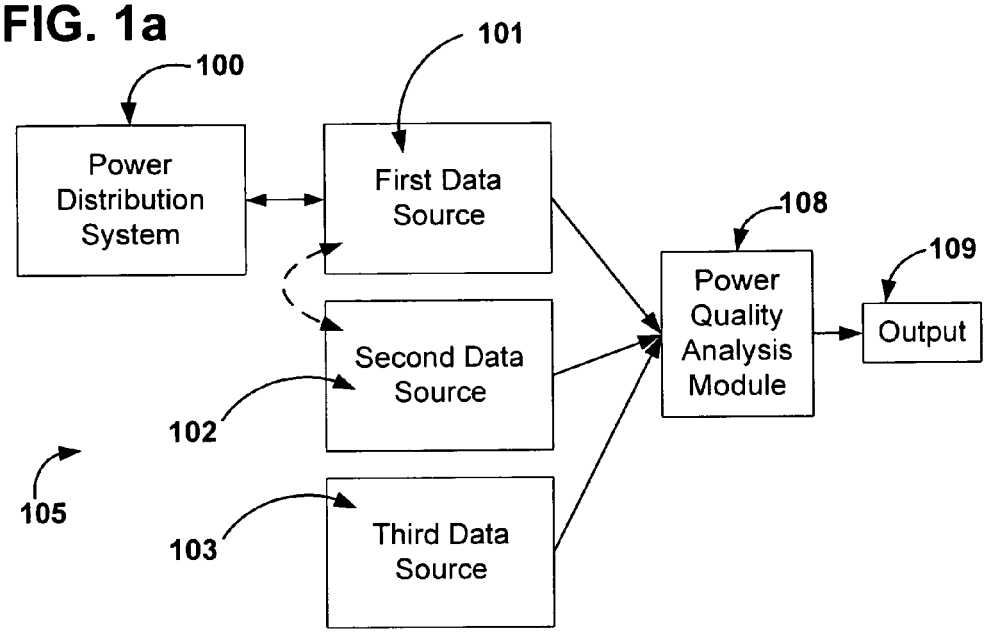
FIG. 1a depicts an overview of a power quality analysis system according to one embodiment.

FIG. 1a shows an exemplary power management system 105 having a power quality analysis module 108 according to one embodiment. The power management system 105 is coupled with a Power Distribution System 100 and logically includes a Power Quality Analysis Module 108 and various Data Sources 101, 102, 103, wherein at least a first of these Data Sources 101 is coupled with at least a portion of the Power Distribution System 100. The Power Quality Analysis Module 108 includes an output 109, as will be discussed, which may be coupled with a local or remote output device or storage device (not shown), over which the data generated by the Power Quality Analysis Module 108 is communicated. Herein, the phrase "coupled with" is defined to mean directly connected to or indirectly connected through one or more intermediate components. Such intermediate components may include both hardware and software based components. In one embodiment, the Power Distribution System 100, or portion thereof, includes an electrical power distribution system, or portion thereof. The Power Distribution System 100, or portion thereof, is characterized by one or more power quality parameters, such as voltage, current, resistance, impedance, inductance, frequency, phase, etc., which have detectable/measurable values.

Each of the First Data Source 101, Second Data Source 102, and Third Data Source 103 is coupled with the Power Quality Analysis Module 108, either directly or indirectly, such as via one of the other Data Sources 101, 102, 103, for example via the First Data Source 101. It will be appreciated that one or more of the first, second and third Data Sources 101, 102, 103, as well as the Power Quality Analysis Module 108, may be combined in a single device and interconnected with the remaining components via a network or other means as will be described, and all such physical arrangements of the disclosed logical components are contemplated herein.

The First Data Source 101 provides data that is measured, sampled, or otherwise directly derived from the Power Distribution System 100, to the Power Quality Analysis Module 108. This measured data may include one or more values of one or more of the power quality parameters which characterize the power distribution system 100. As will be discussed below in connection with FIG. 1c, this measured or sampled data is also referred to as Power Quality Parameter Values, Power Quality Event Data or Power Quality Data and may include data representative of the values of one or more of the power quality parameters: voltage, current, resistance, impedance, inductance, phase, frequency, etc., or other measurable/detectable characteristic of the flow of electrical energy through a conductor. In particular, Power Quality Parameter Values may include an analog and/or digital representation of one or more instantaneous measurements or samples of the particular characteristic(s) taken at a particular time, or over a particular period of time. For ease of reference, herein the term Power Quality Parameter Values may refer to these measurements/samples both collectively and individually. In one embodiment, the First Data Source 101 may include a measuring device, such as a power meter or other intelligent electronic device ("IED"), described in more detail below, which measures or samples Power Quality Parameter Values from the Power Distribution System 100, such as the voltage or current, and stores, or otherwise provides, those values in either an analog or digital form. Alternatively, the First Data Source 101 may be a database, web service, some other publication service, a separate measuring device, or external power quality system or external data storage capable of receiving, storing and serving up such data.

The Second Data Source 102 provides data that is derived, directly or indirectly, from, or as the result of an evaluation, comparison or categorization of, Power Quality Parameter Values, discussed above, either intrinsically, i.e. among itself such as comparing one measurement against another, and/or extrinsically, e.g. versus a threshold, scale or other metric. This data is referred to as Power Quality Event Properties and will be discussed further in connection with FIG. 1c. Power Quality Event Properties are derived from the Power Quality Parameter Values, or result from an evaluation thereof, such as the relationships between one subset of the Power Quality Parameter Values and another subset of the Power Quality Parameter Values, such as the relationship between different instantaneous measurements, e.g. difference or magnitude. Power Quality Event Properties, where a temporal based scale or metric is used in the derivation, evaluation or categorization, are referred to as time properties, such as the calendar, i.e. day/date/clock time, relative and/or absolute time that the measurement or sample was obtained, the duration over which measurements or samples were obtained, the temporal relationship between measurements or samples, or other related temporal, scalar or sequential characteristic. Further Power Quality Event Properties may include more complex comparisons/evaluations of multiple subsets of Power Quality Parameter Values among themselves and/or in conjunction with a scale or reference, temporal or otherwise. As an example, the Second Data Source 102 may evaluate Power Quality Parameter Values, to produce Power Quality Event Properties, such as the existence, magnitude, or duration of a power quality event, i.e. what type of event occurred such as a sag swell or surge, when did it occur in relation to some other event, and what were the specific characteristics of that event, such as its magnitude, duration, frequency of occurrence, or elapse of time since a previous event occurred.

The Third Data Source 103 includes data that is neither related to, nor derived from, Power Quality Parameter Values as described above. This data is referred to herein as Non-Power Quality Properties and will be discussed below in connection with FIG. 1c. As an example, the Third Data Source 103 may include Non-Power Quality Properties, such as calendar date, time (also referred to herein as time properties), weather parameters, cost parameters, or other metrics, etc., that are neither measured or sampled from the power distribution system 100 nor derived from or in relation to the Power Quality Parameters or their values. Either of the Second or Third Data Sources 102, 103 may be an electronic measuring device, IED, database, web service, some other publication service, external power quality system or external data storage capable of receiving, storing and serving up the requisite data. It is also possible for the user to directly enter data into any of the Data Sources 101 102 103 through an appropriate user interface, or, as will be discussed, for a user to directly enter this data into the Power Quality Analysis Module 108, thereby acting as the first, second and/or third data sources 101, 102, 103.

Figure 1B:
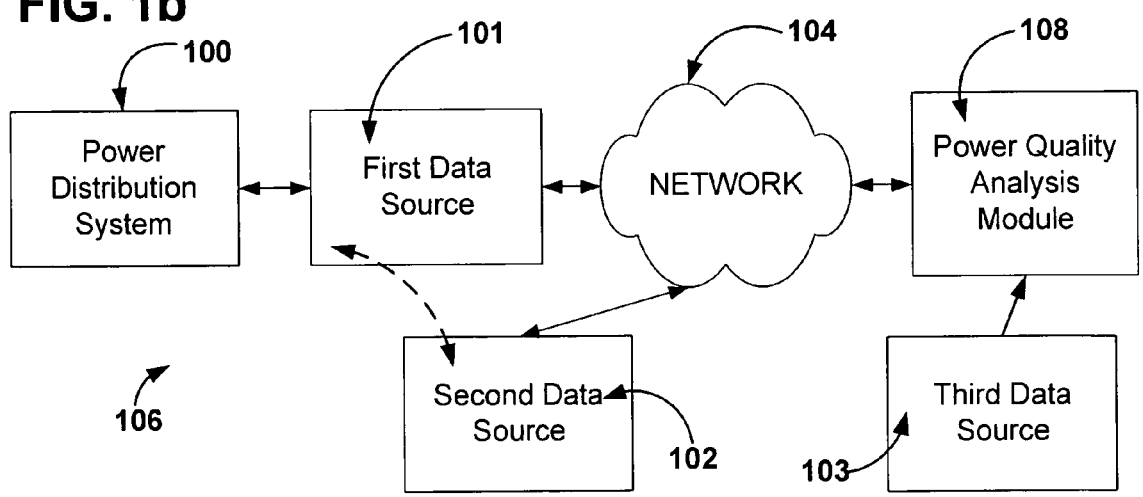
FIG. 1b depicts a power quality analysis system according to a second embodiment.

The Power Quality Analysis Module 108 receives inputs from the Data Sources 101, 102, 103 and computes power quality information, which is communicated over the output 109 as discussed below. In one embodiment, the Power Quality Analysis Module 108 may be connected to any of the Data Sources 101, 102, 103 through a network 104 as shown in FIG. 1b. The network 104 may include wired or wireless networks, or portions thereof, including public or third-party operated networks such as: Virtual Private Networks ("VPNs"), Local Area Networks ("LANs"), Wide Area Networks ("WANs"), telephone, dedicated phone lines (such as ISDN or DSL), Ethernet, paging networks, leased line; Wireless including radio, light-based or sound-based, Power Line Carrier schemes, cellular, mesh, Bluetooth, or combinations thereof, and may be TCP/IP based, such as the Internet, an intranet or a combination thereof. The Power Quality Analysis Module 108 may be comprised of any suitable software or hardware required to receive data from the Data Sources 101, 102, 103 or via the network 104. In one embodiment, the Power Quality Analysis Module 108 may be implemented as a hardware device. In an alternate embodiment the Power Quality Analysis Module 108 is a software product with program modules that run on one or more personal or mainframe computers or servers with supporting hardware/software and network connections.

The Data Sources 101, 102, 103 may collectively or individually record and store power quality parameter values, power quality event properties, non-power quality properties, time properties, or power quality information, control data or commands, as described above. In one embodiment, the First Data Source 101, the Second Data Source 102, and the Third Data Source 103 may all be implemented in a single device, i.e. a Fourth Data Source, that comprises each of the First Data Source 101, the Second Data Source 102, and the Third Data Source 103, which may further include the Power Quality Analysis Module 108. For example a power meter may include a measurement component which measures or samples a power quality parameters of the power distribution system and generates a digital representation or value based on the measurement, the measurement component being the First Data Source 101. The exemplary power meter may further include a processor and suitable software, which evaluates the digital data provided by the measurement component against a threshold or scale to determine if a power quality event has occurred, the processor and software being the Second Data Source 102. The exemplary power meter may further include a calendar device which provides calendar data which may be used to determine when power quality events occur, the calendar device being the Third Data Source 103. Finally, the exemplary power meter may include additional software which is operative to analyze the power quality event in view of the calendar data to determine and report when the power quality event occurred, the additional software being the Power Quality Analysis Module 108. Alternatively, any combination of the First Data Source 101, the Second Data Source 102, the Third Data Source 103, and the Power Quality Analysis Module 108 may be implemented in a single device. For example, the First Data Source 101 and the Second Data Source 102 may be included in a single device while the third Data Source 103 and Power Quality Analysis Module 108 are comprised in separate devices. Data may be communicated from each of the Data Sources 101, 102, 103 to the Power Quality Analysis Module 108, or, alternatively, to another one of the Data Sources 101, 102, 103 or other storage device/media from which it may be transmitted to, or retrieved by, the Power Quality Analysis Module 108 at a later time. Power Quality information generated by the Power Quality Analysis Module 108, discussed in more detail below, may be stored in any one of the Data Sources 101, 102, 103 for later retrieval, or in other data storage, either internal or external to the Power Quality Analysis Module 108, such as for use in or incorporation into subsequent analyses.

Where the First Data Source 101 is a measuring device, it may be any device that is coupled with at least a portion of a Power Distribution System 100, and is able to monitor the power quality parameters of the Power Distribution System 100, such as an Intelligent Electronic Device ("IED"), e.g. a power meter or relay. Alternately, the First Data Source 101, like the Second Data Source 102 and the Third Data Source 103 may be a database, an external power quality system, a web service, a data acquisition module or some other data server. The Second Data Source 102 and the Third Data Source 103 may also be IED's.

IEDs include revenue electric watt-hour meters, protection relays, programmable logic controllers, remote terminal units ("RTUs"), fault recorders, other devices used to monitor and/or control electrical power distribution and consumption, RTUs that measure water data, RTUs that measure air data, RTUs that measure gas data, and RTUs that measure steam data. IEDs are widely available that make use of memory and microprocessors to provide increased versatility and additional functionality. Such functionality includes the ability to communicate with other hosts and remote computing systems through some form of communication channel. IEDs also include legacy mechanical or electromechanical devices that have been retrofitted with appropriate hardware and/or software allowing integration with the power management system. Typically an IED is associated with a particular load or set of loads that are drawing electrical power from the power distribution system. The IED may also be capable of receiving data from or controlling its associated load. Depending on the type of IED and the type of load it may be associated with, the IED implements a function that is able to respond to a command and/or generate data. Functions include measuring power consumption, controlling power distribution such as a relay function, monitoring power quality, measuring power parameters such as phasor components, voltage or current, controlling power generation facilities, computing revenue, controlling electrical power flow and load shedding, or combinations thereof. For functions that produce data or other results, the IED can push the data onto the network to another IED or back end server/database, automatically or event driven, or the IED can send data in response to an unsolicited request. IEDs capable of running Internet protocols may be known as "web meters." For example, a web meter may contain a web server allowing for access to the meter using the hypertext transport protocol or other TCP/IP based network protocols.

FIG. 1*b* shows a power quality analysis system 106 according to a second embodiment. In this embodiment, both the First and Second Data Sources 101, 102 are coupled with the Power Quality Analysis Module 108 via the network 104. The Third Data Source 103 is coupled directly to the Power Quality Analysis Module 108 rather than being coupled through the network 104. It should be understood that in alternative embodiments any of the three Data Sources 101, 102, 103 could be coupled to the Power Quality Analysis Module 108 via the network 104 or via any other connection or the Data Sources 101, 102, 103 could be coupled to one another.

FIG. 1*c* shows a block diagram of a Power Quality Analysis Module 108 for use with the embodiment of FIG. 1*a* or 1*b*. The Power Quality Analysis Module 108 includes an Input Module 132, having various inputs 122-124, a Processing Module 134, and an Output Module 136. The Input Module 132 receives data via the inputs 122-124 from the data sources 101-103 and sends the received data to the Processing Module 134, which processes the data and sends the processed data to the Output Module 136, which outputs the processed data, i.e. Power Quality Information 140.

The Input Module 132 is coupled with the Data Sources 101, 102, 103 and, as discussed above, receives as inputs, at least one Power Quality Parameter Value 122, at least one Power Quality Event Property 123, and at least one Non-Power Quality Property 124 from the respective data sources. As discussed above, in an alternative embodiment, the Power Quality Event Property 123 and/or Non-Power Quality Property 124 may further include one or more time properties, as will be described in more detail below. Any of the inputs 122-124 may be directly or indirectly retrieved or received from various Data Sources 101, 102, and 103.

The Input Module 132 may include a communications interface (not shown) whereby the Power Quality Analysis Module 108 is coupled with the Data Sources 101, 102, 103 or coupled with a network 104. The communications interface includes appropriate hardware and software for receiving data for the Power Quality Analysis Module 108. In one embodiment, the Input Module 132 may include a user interface, such as a graphic user interface ("GUI"), whereby a user may manually input any of the inputs 122-124. This GUI may be provided by a local or remote client, a separate device, a software program, or a web browser through which a user can enter data. The Input Module 132 may further pre-process the inputs 122-124 such as by normalizing the received data, checking the received data for errors and correcting those errors or requesting the data, verifying data authenticity or otherwise ensuring the regularity, security and legitimacy of the received data.

The Input Module 132 is coupled with the Processing Module 134, and passes the inputs 122-124, pre-processed or as-received, to the Processing Module 134. The Processing Module 134 performs the requisite analysis of the received Power Quality Parameter Values 122, the Power Quality Event Properties 123, and the Non-Power Quality Properties 124 to generate Power Quality Information 140, as will be described in greater detail below.

The Processing Module 134 is coupled with the Output Module 136. The Processing Module 134 transmits the Power Quality Information 140 to the Output Module 136, which is responsible for providing the user or third party applications/entities with the generated Power Quality Information 140. The generated Power Quality Information 140 is provided, by the output module 136 via the output 109 as shown in FIG. 1*a*, to the intended destination(s). The Output Module 136 may serve as a communications interface coupling the Power Quality Analysis Module 108 with a network or with any of the Data Sources to facilitate the transfer of Power Quality Information 140. Wherein the transfer of data is over the network 104, the Output Module 136 may operate as a web server or network communications interface, in either a push or pull fashion. The Output Module 136 may further translate, normalize or otherwise convert the data to be transmitted. As will be described below in relation to FIGS. 2*a*-2*j*, the Output Module 136 may comprise a local or remote graphical user interface (GUI), which maybe the same GUI used by the Input Module 132 described above, by which the Power Quality Information 140 is displayed and through which the user can interact with the Power Quality Analysis Module 108. The Output Module 136 may be combined with either the Input Module 132 or the Processing Module 134 or both. All three modules may comprise the same module or they may be separately coupled to one another.

The Power Quality Information 140 may be communicated to a particular destination, such as by making it available for access such as on a web server, or via an application programming interface ("API"). In one embodiment, the Power Quality Information 140 may be utilized as an input into any component of the system represented by FIG. 1*a* or 1*b*, or to another Power Quality Analysis Module 108. For example, Power Quality Information may be inputted into any of the Data Sources 101-103, or may be the input into the Power Quality Analysis Module 108 to be incorporated into a subsequent analysis. The Power Quality Information 140 may be displayed on a local or remote display screen for a user to view, may be stored in at least one of the Data Sources 101, 102, 103, or may be sent to an external system. The display screen may be coupled to the system through a network or coupled with any of the components of the system directly and operative to display data and have a GUI through which the user interacts with the system. The Power Quality Information 140 will be described in greater detail below. The Input Module 132, the Processing Module 134, and the Output Module 136 may all be separate components or may be integrated together as one component, either in hardware, software or a combination thereof.

As was described above, the Power Quality Parameter Values 122 include data values which were directly derived from the Power Distribution System 100, such as one or more instantaneous measurements or samples taken from a power distribution system, and include data representative of the power quality parameters. In one embodiment, the First Data Source 101 is an IED coupled with at least a portion of the power distribution system 100 and operable to take one or more measurements therefrom, the measurements including one or more samples or data points, represented in either analog or digital form. The Power Quality Parameter Values 122 may include real data measured from an actual power distribution system, or may include hypothetical data, or combinations thereof. Hypothetical data may include historical data recorded from a power distribution system at some time in the past, estimated data, data predicted to occur in the future, data that has been scaled, data that has been shifted, data that has been edited, data that has been estimated/interpolated, data that has been normalized and/or data that has been modeled. Hypothetical data can be used to run "what-if" scenarios, generate forecasts and to correct missing or false data. Data may be edited where an error in the original data requires correction or where alternative scenarios are desired. Data may be predicted, estimated or interpolated, based on a previous pattern or some other model, where the original data is not available, such as having been lost or not yet generated. The data can be modeled using multivariate regression, neural networks, Fast Fourier Transforms ("FFT") and so forth. The Power Quality Parameter Values 122 may be in different power quality data formats, including PQDIF and COMTRADE formats.

The Power Quality Event Properties 123 include data representative of an evaluation, comparison, categorization and/or derivation of one or more Power Quality Parameter Values 122, or a subset thereof. The Power Quality Event Properties 123 are at least indirectly derived from the Power Quality Parameter Values 122 and may be related to a particular power quality event and the underlying actual measurements or samples thereof. An exemplary Power Quality Event Property 123 may be the type/category of the event derived from a categorization of one or more of the Power Quality Parameter Values 122 as compared to a threshold or other metric, for example: sag, swell, transient, interruption, phase event occurred on and so forth. The Power Quality Event Properties 123 may describe actual facts about a particular power quality event, such as the magnitude or duration of the event, or include a graphic representation of the event, such as a waveform, and so forth based on the evaluation, comparison, or categorization of Power Quality Parameter Values 122. A power quality event may occur when voltage, current or frequency deviates from some pre-defined normal/threshold value, which may include a previous measurement, and may affect end use equipment such that the end use equipment may be damaged, may fail, or may not work correctly.

A Non-Power Quality Property 124 includes data which is not derived, directly or indirectly, from a measurement or sample taken from the power distribution system or from a power quality event. The Non-Power Quality Properties 124 are independent of the measured parameters of the power distribution system, and in particular, independent of a specific power quality event, though they may include data related to the source that recorded the event or factors surrounding the event's occurrence. For example, the Non-Power Quality Properties 124 may include data such as operational, environmental and/or financial properties. Examples of operational and environmental properties include temperature, humidity, weather related events (lightning, flood, heat wave, etc.), source of energy (for example coal, hydro, wind and so forth), voltage level, full load current, power factor, demand, energy, circuit, feeder, measuring device type, communications type, type of equipment, production units, shift, process, manager of an area, floor/zone/row/rack, square footage, occupancy, geography, and so forth. Examples of financial properties include energy cost (actual or projected), cost center, fiscal year, budget quarter and bill period.

As discussed above, Power Quality Event Properties 123 and/or Non-Power Quality Properties 124 may further include at least one time property. Time properties relate to some form of temporal characteristic, either generally (non-power quality property), such as calendar date or present time, or in relation to some power quality parameter (power quality event property), such as an event duration or a time interval currently of interest. Examples of time intervals include day of week, day of month, day of year, hour of day, week of year, month of year, year, minute, calendar quarter, work week (weekday vs. weekend or holiday), age of the event, and so forth. For ease of reference, a time property is defined independently from Power Quality Event Properties 123 and Non-Power Quality Properties 124 because it may be a component of either. For example, when determining a whether a swell was present, the swell is measured over a finite period of time. This time period, i.e. duration of the swell event, would be classified as a time property but also as a power quality event property because it is derived from the power quality parameter values, i.e., the number of sequential samples meeting the threshold to be considered a swell.

Power Quality Analysis

The Power Quality Analysis Module 108 receives input data including the Power Quality Parameter Values 122, the Power Quality Event Properties 123, the Non-Power Quality Properties 124 and the Time Properties 126, and processes them to generate Power Quality Information 140, which allows the user to understand and analyze the power quality in the subject power distribution system. The processing may include, individually or in combination, modeling, predicting, normalizing, trending, aggregating, categorizing, classifying, comparing, benchmarking, visualizing, annotating, querying, grouping, "what-if" analysis, waveform analysis, forecasting, control actions, cost determination and/or contract compliance, or other functions or processes which yield a relationship between the past, present or future status of the power distribution system and the independent factors surrounding that status. In one embodiment, the Power Quality Information 140 includes a visualization, such as a chart or graph, of a relationship between the input data that allows a user to make a subsequent analysis or derive relationships. For example, the Power Quality Information may include a suggestion as to the cause of a power quality event, for example: weather (lightening strike, etc), wildlife, turning on/off a big piece of equipment and so forth). The cause could be determined based on the analysis or processing of the Power Quality Parameter Values 122, Power Quality Properties 123 and Non-Power Quality Properties 124. A known event or cause may produce expected Power Quality Parameter Values 122, the subsequent analysis thereof resulting in Power Quality Information indicating the cause of the event. The following are examples of some of the possible analyses which may be performed using the disclosed embodiments. It will be appreciated that there may be a myriad of applications of the disclosed functionality and all such applications are contemplated.

In one embodiment, the Processing Module 134 correlates power quality events with one or more external factors such as weather, temperature or production run, using some technique such as linear regression in order to create a model that may model and/or predict future power quality events. For example, the processing module 134 may generate power quality information representative of a prediction as to how many more power quality events would occur if the temperature were to increase by one degree.

In another embodiment, the Processing Module 134 relates the frequency of power quality events to some dimension of a facility such as total square footage, leased and occupied square footage, leased and unoccupied square footage, production units, etc. in order to normalize the data so that a fair comparison may be made between different facilities or processes.

In yet another embodiment, the Processing Module 134 measures trends by plotting recent or historical power quality events over time and optionally plotting them against other non-power quality data, such as plotting a recent trend of power quality events versus the weather conditions occurring over the measured time period.

In yet another embodiment, the Processing Module 134 groups power quality events so as to present a summary view of events in the system. In one embodiment, this aggregation is accomplished by taking the worst event in the group and using it as a characteristic event for the group.

In yet another embodiment, the Processing Module 134 categorizes an event using an Institute of Electrical and Electronic Engineers ("IEEE") standard or custom parameters. Standard categorizations for power quality events include transient, sag, swell, and interruption.

In yet another embodiment, the Processing Module 134 assigns a predefined cause or severity to one or more selected events in order to classify the data. Examples of causes include lightening strike, storm event, capacitor bank switch and so forth. Classification of data can be used to create a searchable database of power quality events. Alternatively, the user can customize the way in which power quality events are classified, such as by defining custom classifications or redefining the conditions which must be met for a given classification.

In yet another embodiment, the Processing Module 134 allows for visualization of data to present power quality events displayed on duration vs. magnitude plots overlaid with predefined overlays (Computer Business Equipment Manufacturers Association ("CBEMA") etc.). Alternatively, the visualization may be to see how events occurred over time or to see the N worst events as measured by a number of predefined criteria.

In yet another embodiment, the Processing Module 134 the user annotates the data by to adding: comments or observations on an event; details of what caused the event; customer reports/complaints; information about resolution of the problem; or damage reports, etc.

In yet another embodiment, the Processing Module 134 indexes, categorizes or classifies data so the user can search on past events that have been categorized in a certain way.

In yet another embodiment, the Processing Module 134 groups events by source, by time data dimension or by phase, allowing for visualization of clustering.

In yet another embodiment, the Processing Module 134 performs a hypothetical analysis on the data, such as "what-if" analysis include: "what-if" the weather gets hotter?, or "what-if" some plants are closed?, or the load profile is changed? etc. For example: "If the average wind speed is on average 5 km/h faster next summer, how many more power quality events will I likely have?". "What-if" analysis is useful when making budgeted to actual comparisons, such as forecasting costs associated with power quality events.

For example, a forecasting module may have a forecast containing typical events and associated costs for some time period, wherein, as intervals of the time period complete/elapse, the forecasted intervals can be replaced by the real values, and the actual can be calculated on the fly (combining the real and predicted values). Further, differences between the forecasted and actual values may be computed and used to refine the forecasting model.

In yet another embodiment, the Processing Module 134 performs a control action such as planning for equipment replacement.

In yet another embodiment, the Processing Module 134 performs a cost determination. An example of cost determination may be to calculate the business cost an organization incurs due to power quality events. In this case power quality data may be combined with other power quality event properties or Non-power quality event properties such as production volumes, production yields, equipment maintenance, and equipment failures to calculate a power quality event cost. This information may then be combined with other measurements and statistics to perform economics calculations such as return-on-investment ("ROI") concerning things like maintenance schedules, backup generation planning and power purchase contracts.

In yet another embodiment, the Processing Module 134 determines contract compliance such as verification for an end-user on whether power that has been provided meets the promised standard of quality.

Querying

The Power Quality Analysis Module 108 may operate autonomously and/or may operate at the direction of one or more users, accepting user inputs to control the performance of the various available analyses. These inputs may be received via a user interface or via some other means such as through the transfer of data from any of the Data Sources 101-103. In one embodiment, the Power Quality Analysis Module 108 includes a graphic user interface ("GUI"), possibly implemented as part of the Input or Output Modules 132, 136 described above, featuring interface elements, such as buttons, menus, windows, etc. as are known, used to prompt and receive inputs from a user and display outputs to the user. The GUI may be remote from, or local to, the Power Quality Analysis Module 108, and may be based on HTML or XML. In operation, the GUI receives inputs from the user directing the Power Quality Analysis Module 108 to perform a particular analysis or display a particular result of an analysis in a particular form. The GUI, in response to these inputs directs the Power Quality Analysis Module 108 to perform the requisite functions and then displays the results of these functions as directed by the user. FIGS. 2a-2j, 3a, 3b, 4, 5a, 5b, 6, 7, and 8 depict exemplary screen displays of the disclosed GUI demonstrating the various functions and analyses that may be performed by the disclosed embodiments. It will be appreciated that the aesthetic design of the GUI is implementation dependent and all arrangements and presentations of graphic or text based interface elements which achieve the disclosed functionality are contemplated.

FIGS. 2a-2j show an exemplary screen display of a GUI for power quality analysis. The individual figures represent a sequence of screens that are displayed as a result of the user interactions described below.

Figure 2A:
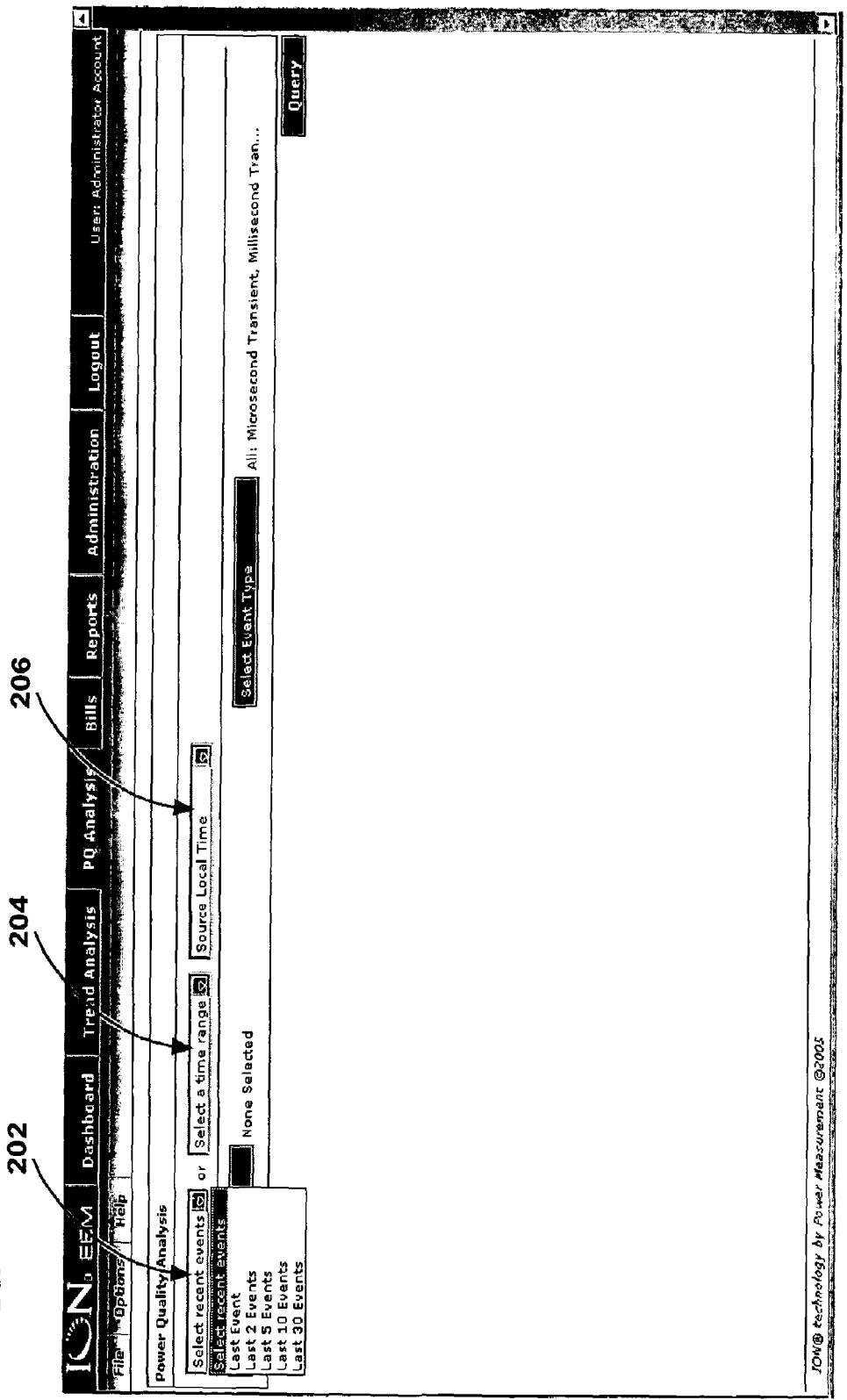

FIG. 2a shows an exemplary screen display of a Power Quality Analysis screen 200 of a GUI for use with the disclosed embodiments which permits a user to select a time range over which to view Power Quality events or other data provided by the disclosed Power Quality Analysis Module 108. The screen 200 depicts various options provided to the user in order to query Power Quality events reported to and stored by the Power Quality Analysis Module 108 and cause the Power Quality Analysis Module 108 to generate particular Power Quality Information therefrom. For example, a recent events drop-down box 202, shown in detail, allows the user to select Power Quality events based on a selected number of the most recent events, these include: Last Event, Last 2 Events, Last 5 Events, Last 10 Events, Last 30 Events, and so forth. A time range drop-down box 204, shown in more detail in FIG. 2b, allows the user to select Power Quality events based on a selected time range. The Source Local Time drop-down box 206, shown in more detail in FIG. 2c, allows the user to select the time zone of the time range selected in the drop-down box 204.

Figure 2B:
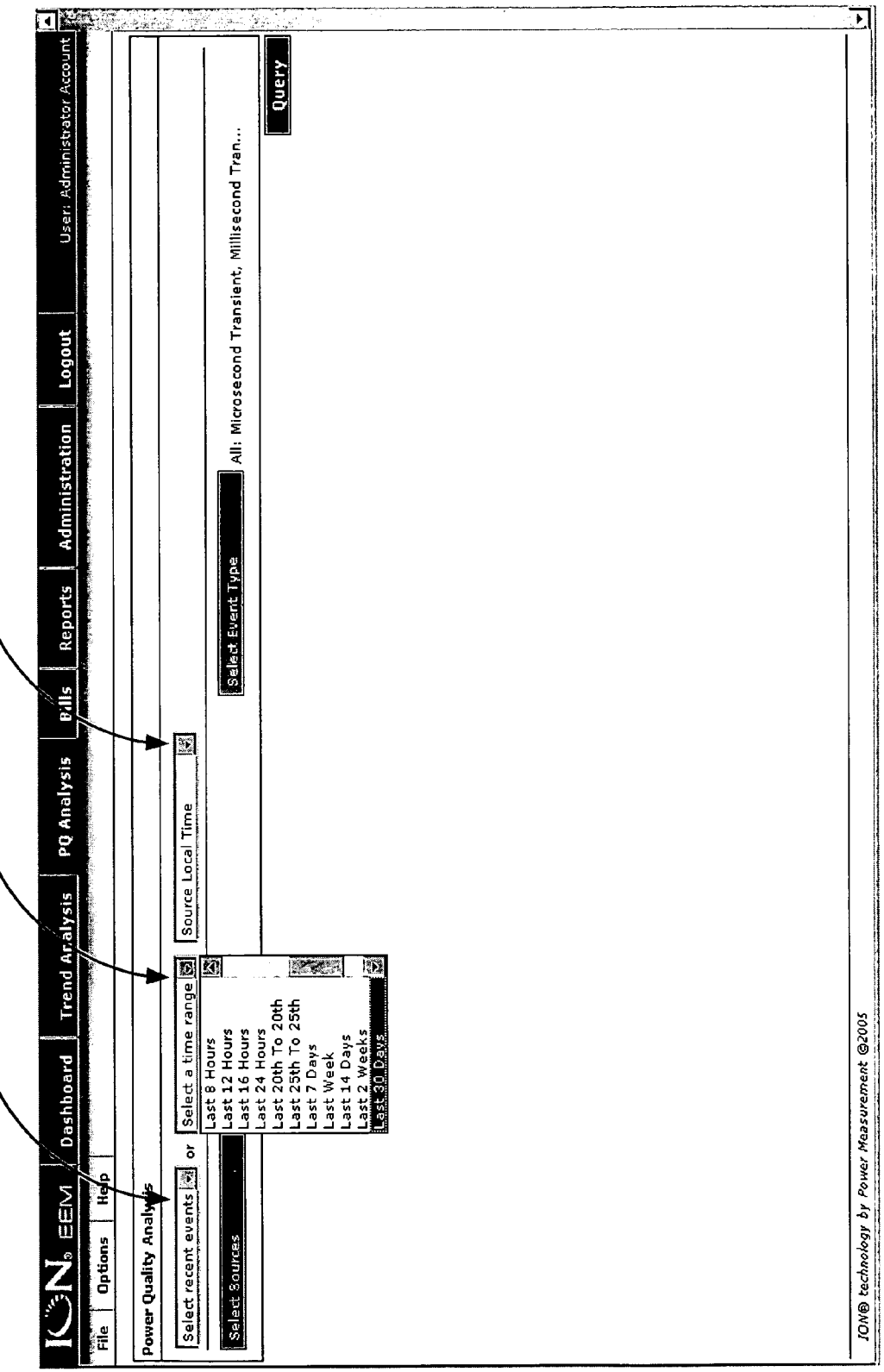

FIG. 2b shows an alternate view of the exemplary screen display 200 of FIG. 2a, with the time range drop-down box 204 shown in greater detail and displaying various selections for time range, such as Last 8 Hours, Last 12 Hours, Last 16 Hours, Last 24 Hours, Last $20^{th}$ to $20^{th}$, Last $25^{th}$ to $25^{th}$, Last 7 Days, Last Week, Last 14 Days, Last 2 Weeks, Last 30 Days, All and so forth. Although most of these choices are prefaced by "last", these time ranges could be any time range. The time range selection allows for data to be displayed that corresponds to that particular time range.

FIG. 2c shows an alternate view of the exemplary screen display 200 of FIGS. 2a-2b with the Source Local Time drop-down box 206 shown in greater detail and providing various selections for the time zone of the associated time range selected in the time range drop-down box 204. Selections include a specific time zone, as well as 'Source Local Time' which indicates that the time selected should be matched with the corresponding local time of the device.

Figure 2D:
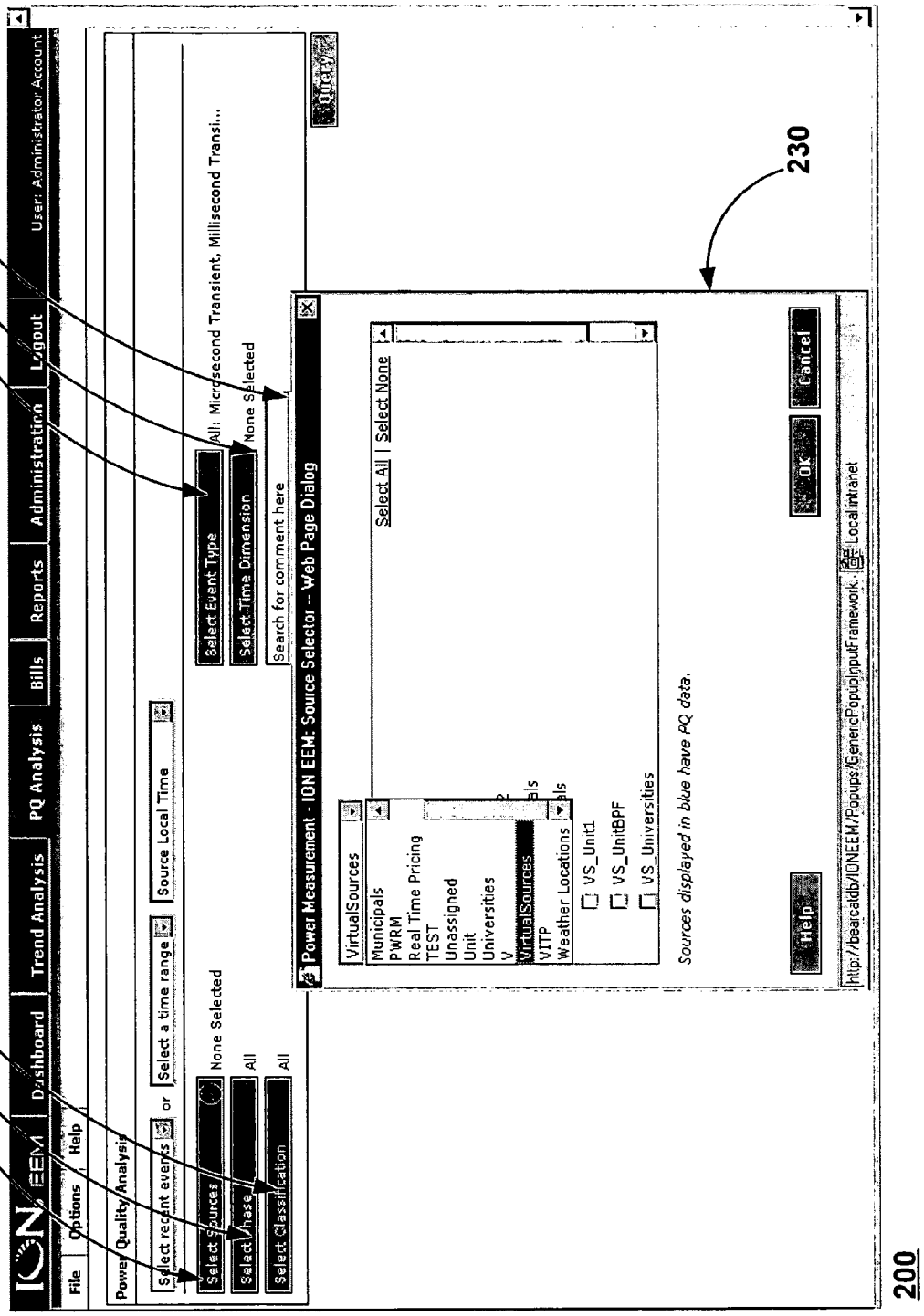
Figure 2E:
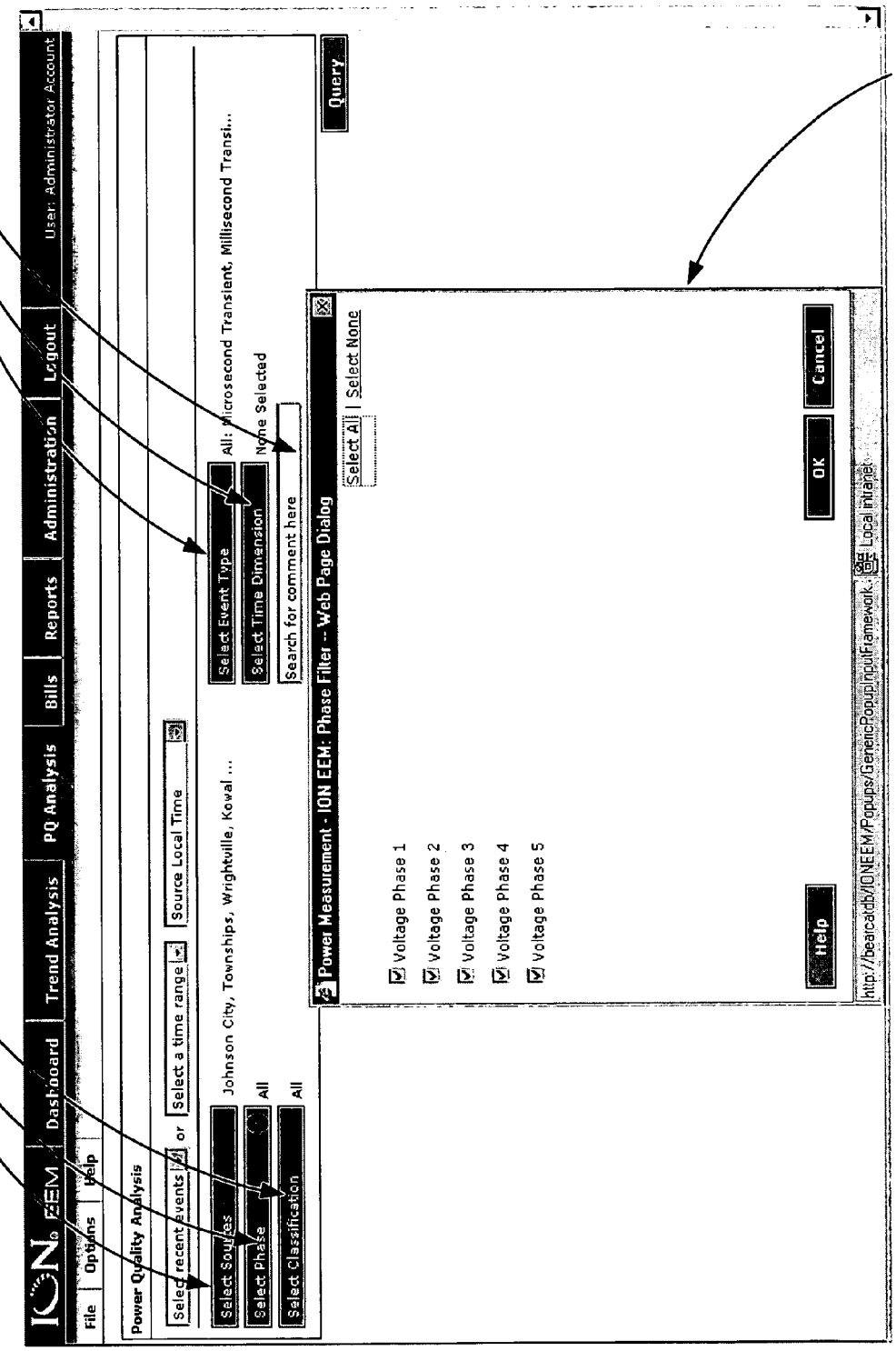
Figure 2F:
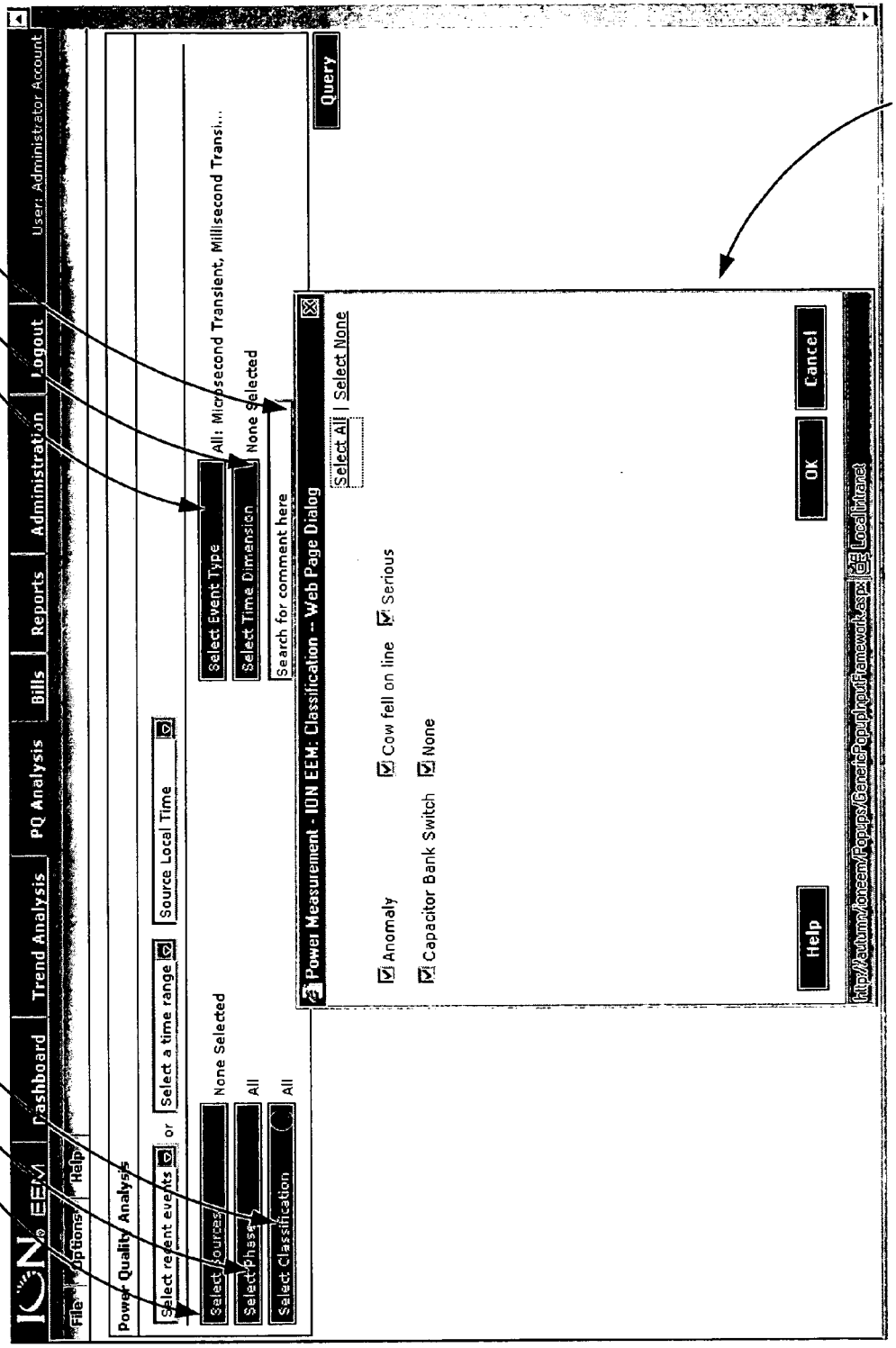
Figure 2H:
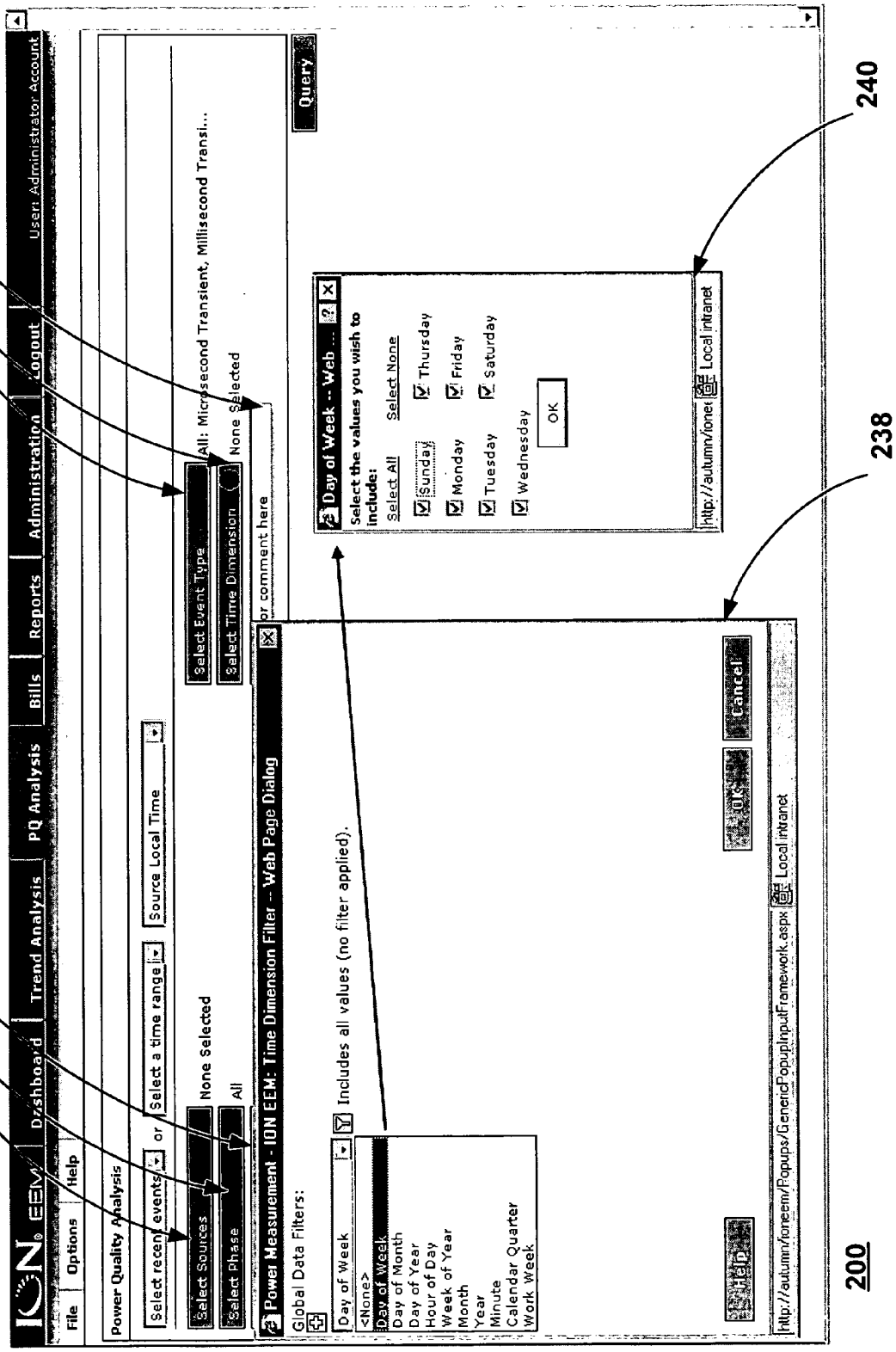

FIGS. 2d-2h show the screen 200 as in FIGS. 2a-2c except it further depicts additional buttons 210, 212, 214, 216 and 218 and a box 220 that allow the user to filter events based on the source, phase, classification, event type, time dimension and associated comment, respectively, of the power quality events they are interested in viewing. Each of FIGS. 2d-2h show a different pop up window, i.e. a temporary window that overlays the screen 200 to receive additional inputs from the user, that results from actuation of buttons 210, 212, 214, 216, and 218, respectively. The select sources button 210 allows the user to sort data based on the source of that data as shown in FIG. 2d. The select phase button 212 allows the data to be sorted based on phase as shown in FIG. 2e. The select classification button 214 allows for data to be organized based on a classification of that data as shown in FIG. 2f. The select event type button 216 allows the event data to be organized based on the type of power quality event as shown in FIG. 2g. The select time dimension button 218 allows data to be displayed for a particular time interval as shown in FIG. 2h. Alternatively, in any of FIGS. 2d-2h, the user may enter a search comment at box 220. This allows the user to query on all events that have a certain comment or search string associated with them. The user may enter a search string in box 220, such as "cow" which will return every event that was in some way associated with a cow, such as a cow falling on a power line. FIGS. 2d-2h are discussed in more detail below.

FIG. 2d shows an alternate exemplary screen display including further options for displaying data based on the source of data. In this figure, the user has actuated the select sources button 210 to create a supplemental "source selector" window 230 displayed on top of the screen 200. The source selector screen 230 allows the user to choose the sources that they wish to see events from. A source is a data source, which is typically a measuring device, such as an IED. Measuring devices may be displayed in a hierarchy, such as geographical location hierarchy. For example, the highest view could be country, which breaks down into individual states, which breaks down to individual cities, which breaks down to individual buildings, which breaks down to individual measuring devices. This hierarchy may be different for each user and may be configurable. The source selector screen 230 may allow the user to select any level of the hierarchy of their sources, right down to the individual measuring devices.

FIG. 2e shows an alternate exemplary screen display including further options for displaying data based on phase filtering. Actuation of the select phase button 212 by the user causes the GUI to display another window 232 on top of the screen 200 which allows the user to select different phases. The phase filter screen 232 allows the user to select which voltage phases for which they want to see Power Quality events for.

FIG. 2f shows an alternate exemplary screen display with a display of possible classifications of data based on a classification screen 234. When the user actuates the select classification button 214, the classification screen 234 is displayed. The classification screen 234 allows the user to select power quality events with a specific classification for viewing. Classification of data can be used to create a searchable database of power quality events. Alternatively, the user can customize the way in which power quality events are customized. Examples shown in FIG. 2f of specific classifications of Power Quality events are an anomaly, a cow fell on power line, serious event, capacitor bank switch, and none.

FIG. 2g shows an alternate exemplary screen display with an event type selector screen 236 of individual event types. When the select event type button 216 is selected, the event type selector screen 236 is displayed. The event type selector screen 236 allows the user to select which type of events they would like to see. A number of standard types of events are listed, such as Microsecond Transient, Momentary Swell, Sustained Interruption and so forth. These values are customizable and may vary per customer requirement. Alternately, the user can select from various standards that define power quality events, such as SARFI 10, SARFI 50, SARFI 70 and so forth. SARFI stands for System Average RMS Variation Frequency Index. Alternately, the user can select events type by inputting custom duration and magnitude values.

FIG. 2h shows an alternate exemplary screen display with a time dimension filter screen 238. When the select time dimension button 218 is selected, the time dimension filter screen 238 is displayed. The time dimension filter screen 238 allows the user to filter which times they wish to see power quality events for. A number of standard time dimensions are listed, such as Day of Week, Day of Month, Day of Year, Hour of Day, Week of Year, Month, Year, Minute, Calendar Quarter, Work Week and so forth. When one of these time dimensions is selected another specific time window 240-258 is displayed, allowing the user to select the details of the time dimension that they have selected. For example, if the user chooses Day of Week, the window 240 is displayed, with the choices of Sunday, Monday, Tuesday, Wednesday, Thursday, Friday, and Saturday. The user can now chose any selection of days to on which to perform their search.

Figure 2I:
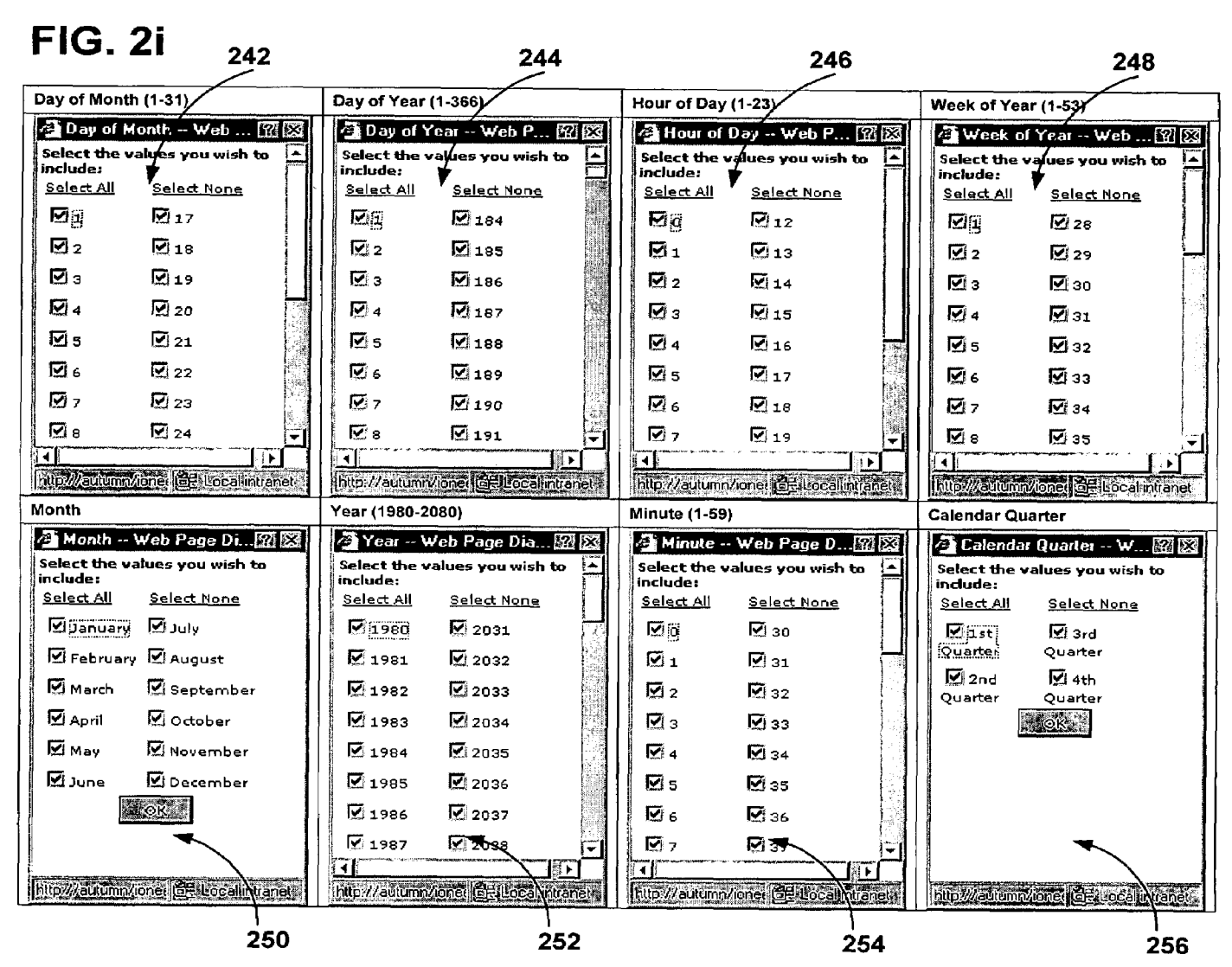
Figure 2J:
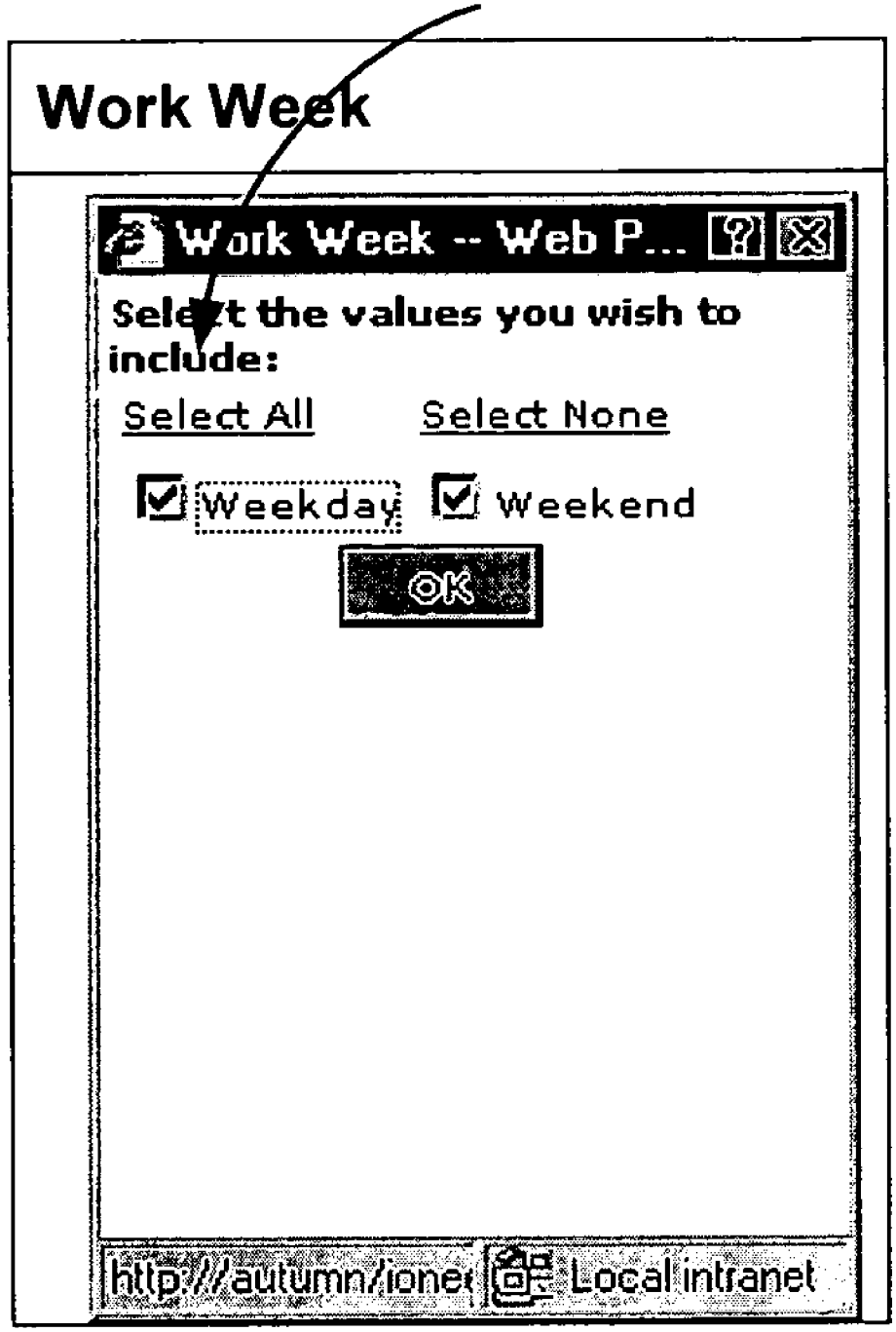

FIGS. 2i and 2j show alternate exemplary screen displays of the specific time windows 242-258. As mentioned above, in FIG. 2h the user selects Day of Week from the time dimension filter screen 238 and the window 240 is displayed showing the options for Day of Week. In FIGS. 2i and 2j, additional windows 242-258 are depicted, indicating how the user may select details for other time dimensions such as Hour of Day or Month. The windows 242-258 would display in FIG. 2h in the way window 240 is shown in FIG. 2h. If the user in FIG. 2h selects a different time dimension then one of the windows 242-258 will be displayed rather than window 240.

The Outputs

Figure 3A:
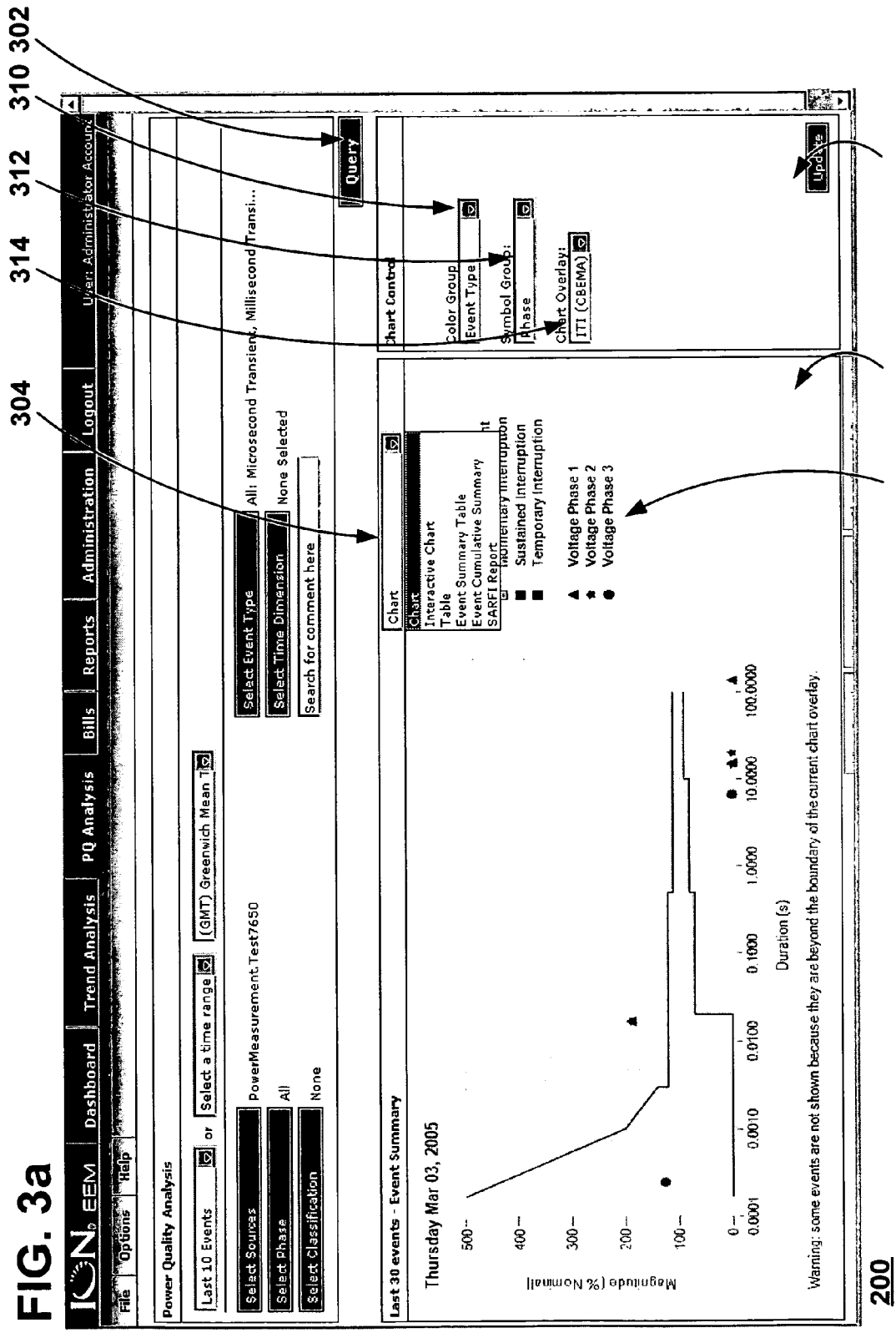
Figure 3B:
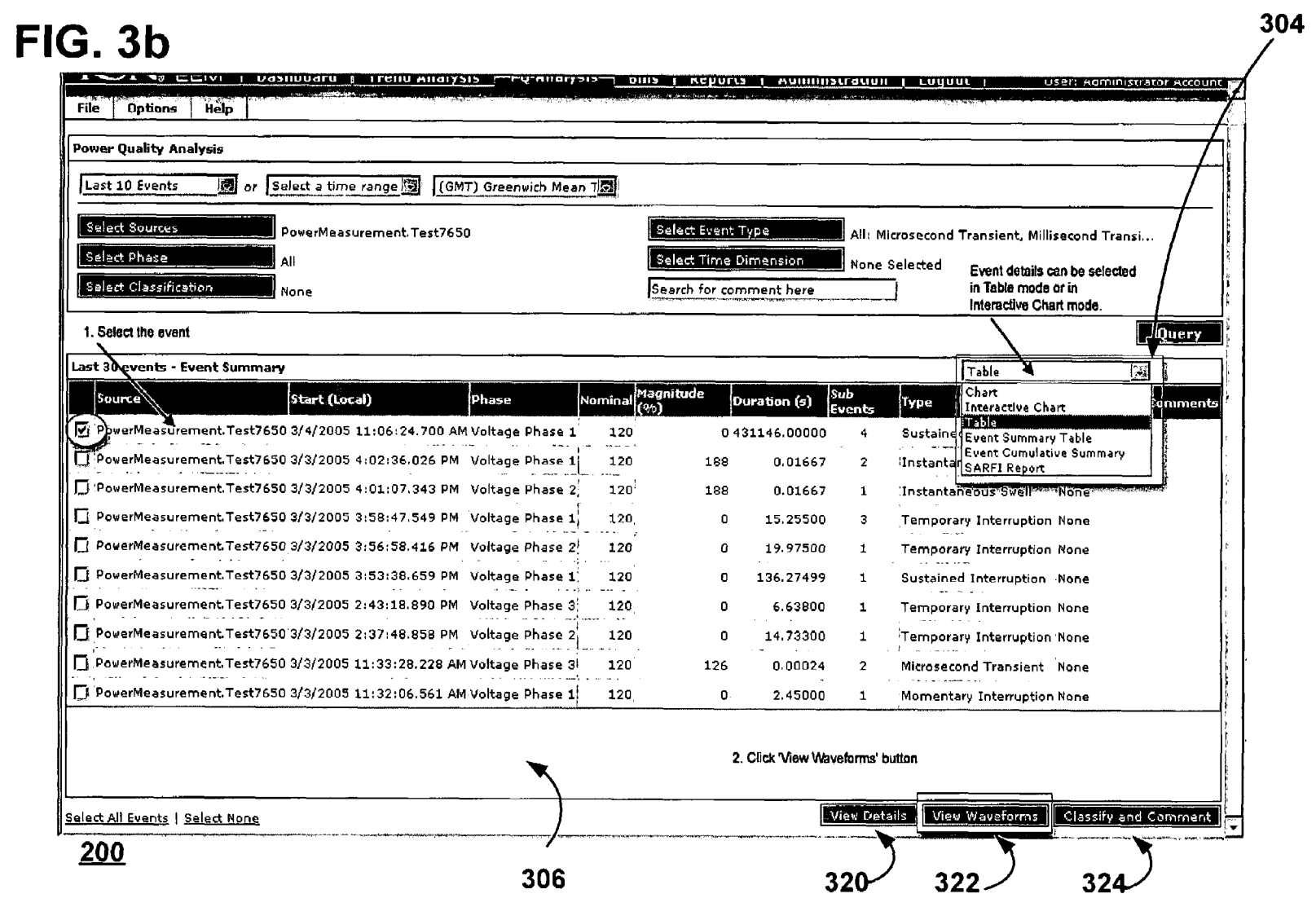

The Power Quality Information 140 created by the Power Quality Analysis Module 108 may be displayed to the user, stored in a database, or forwarded to another application or module. FIGS. 3a and 3b show two exemplary displays of the resultant analysis of power quality data, according to the user inputs described above. After the options shown in FIGS. 2a-2j, have been selected/configured, the user can query the data to create a visual display of an analysis of the data. FIGS. 3a and 3b show exemplary displays of two different analyses of the data. As in FIGS. 2a-2h, the screen 200 depicts the output of a query. After the user has selected the query criteria via the drop-down menus 202-206, the buttons 210-218 and the box 220 as described above, the query button 302 is actuated.

FIG. 3a shows an exemplary event summary window with a chart generated by the power quality analysis system based on user inputs. The user may view the output in various forms, as can be seen in a drop-down menu 304, such as Table, Chart, Interactive Chart (which allows the user to zoom and click on the chart to drill down for details), Event Summary Table, Event Cumulative Summary, SARFI Report and so forth. As shown in FIG. 3a, the user, in the exemplary scenario, has selected the chart view, and the Power Quality events are displayed in an event summary window 306 of the screen 200. A chart control 308 of the screen 200 allows the user to manipulate the appearance of events on the chart displayed in the event summary window 306. Events may be differentiated by colors and symbols 316 to allow the user to highlight related events or to more easily identify patterns in their power quality events. The chart control 308 has the drop-down menus 310, 312, 314 that allow the user to configure how they want the chart to appear. The drop-down menus color group 310 and the symbol group 312 allow the user to select which dimension of the events they want to display on the chart. The user may select a Power Quality Data dimension, a Power Quality Event Properties dimension, a Non-Power Quality Event Properties dimension, or a Time Properties dimension to group by. Furthermore, a drop-down menu chart overlay 314 allows the user to select a chart overlay. This allows the user to quickly identify which events fall outside the bounds of some range defined as important for a given type of equipment or situation. Possible chart overlays include International Technology Industries Council "ITI" (CEBMA), SEMI F47, customs overlays and so forth. SEMI F47 is the semiconductor industry standard for voltage sag immunity. Custom overlays may be used to show tolerances for a specific piece of equipment, for example the tolerance of a motor as it appears on the nameplate.

Figure 4:
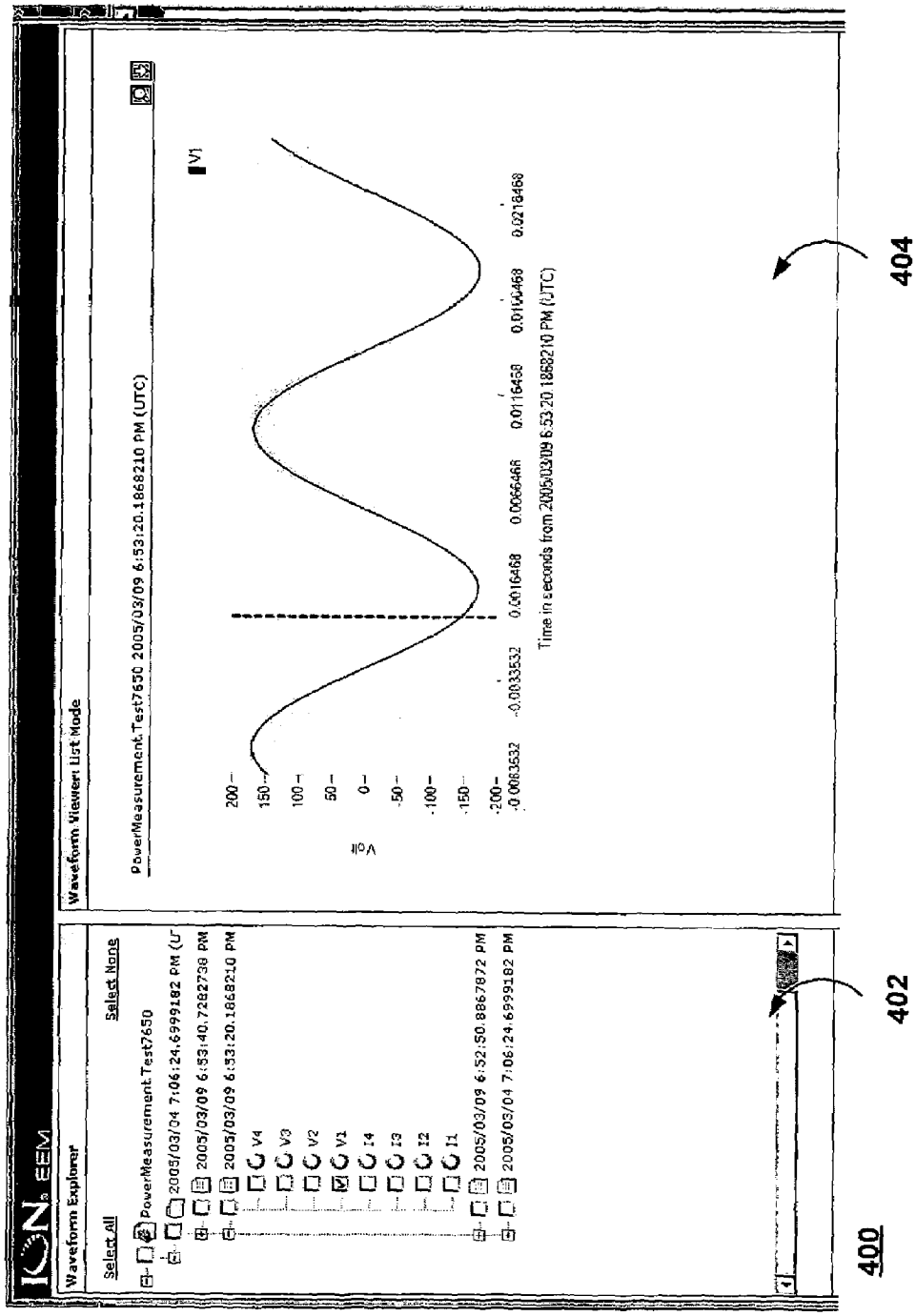
FIG. 4 depicts an exemplary waveform screen outputted by the disclosed embodiments.
Figure 5A:
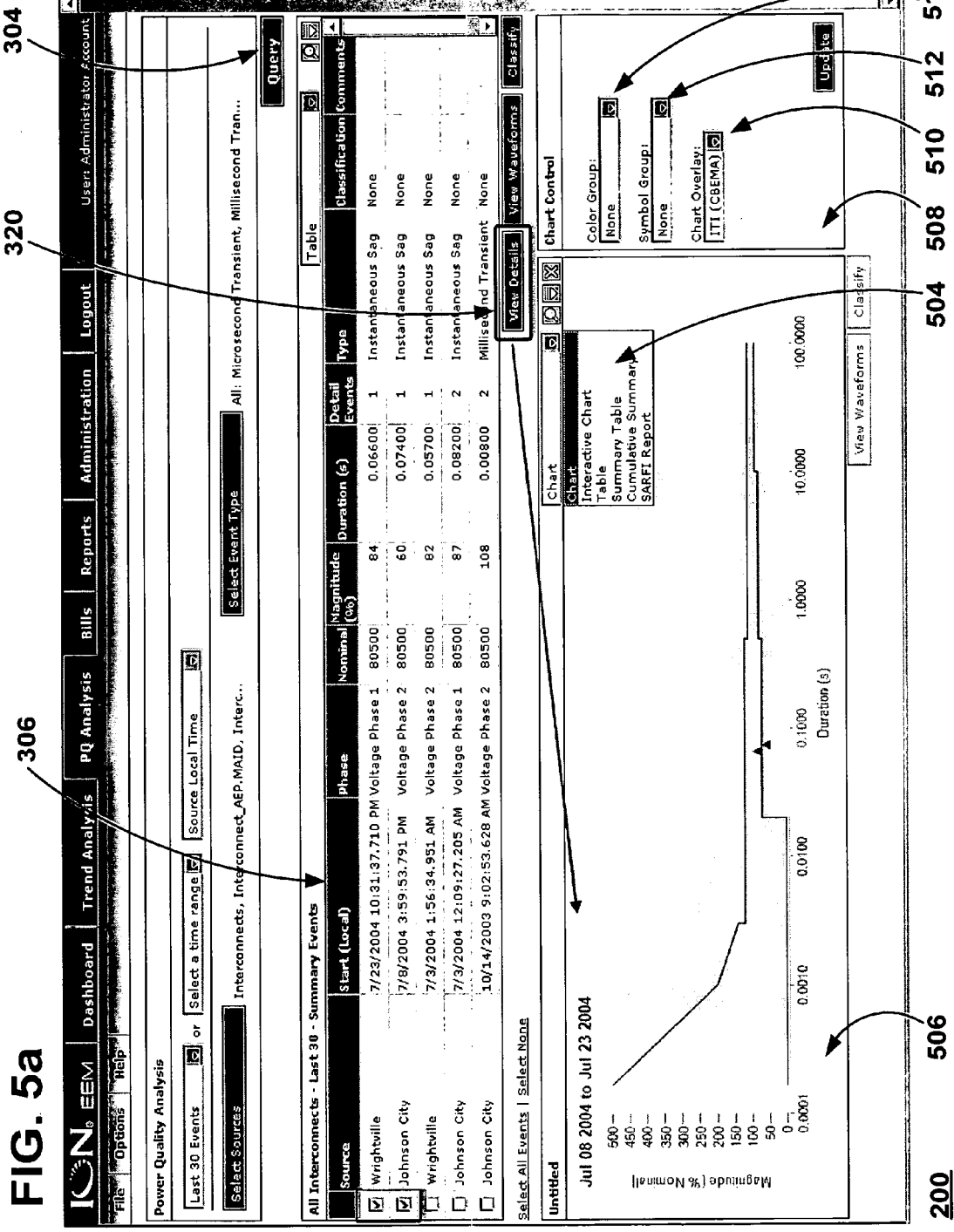
FIGS. 5a and 5b depict exemplary screens displaying power quality events as outputted by the disclosed embodiments.
Figure 5B:
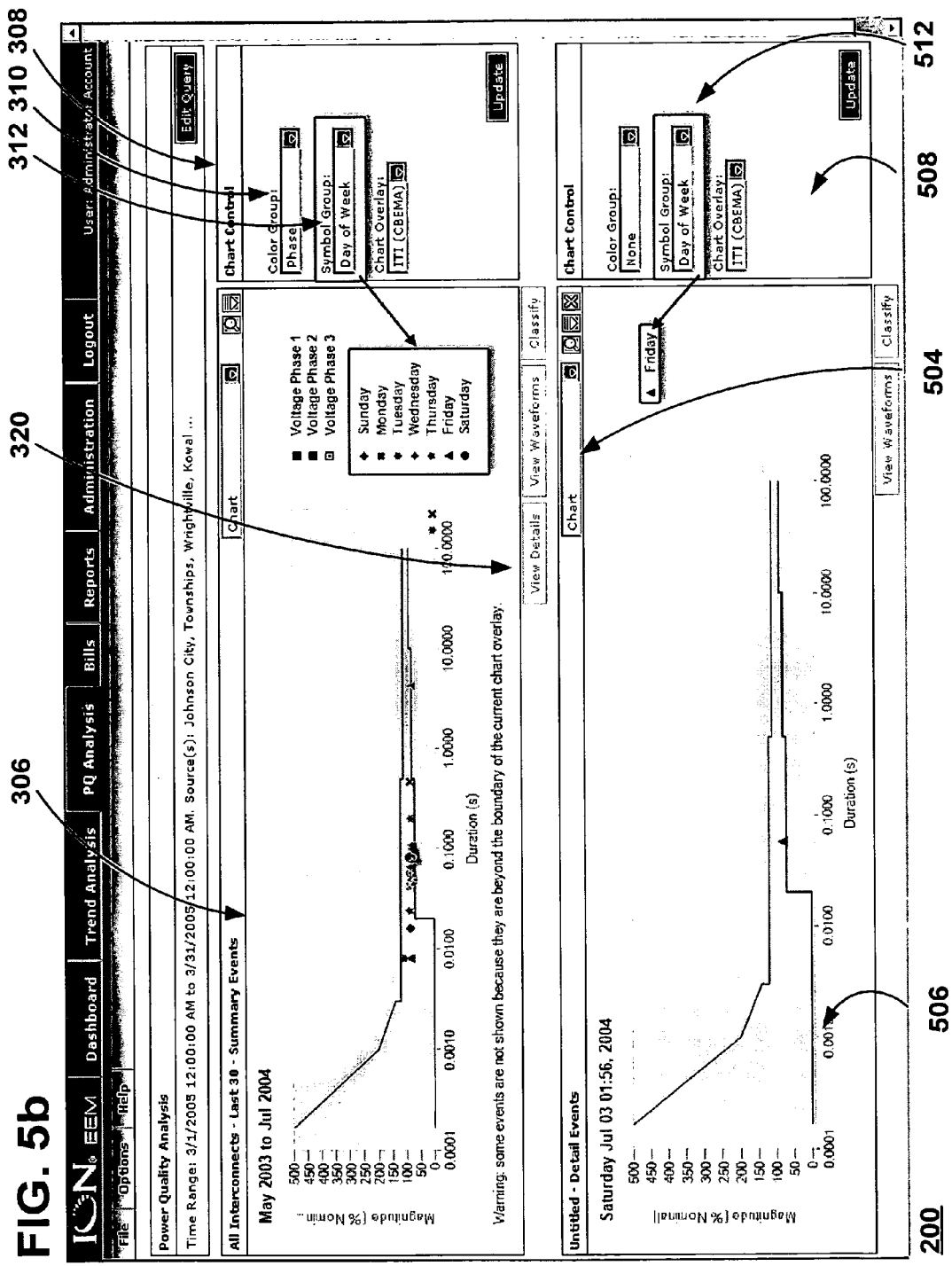
Figure 6:
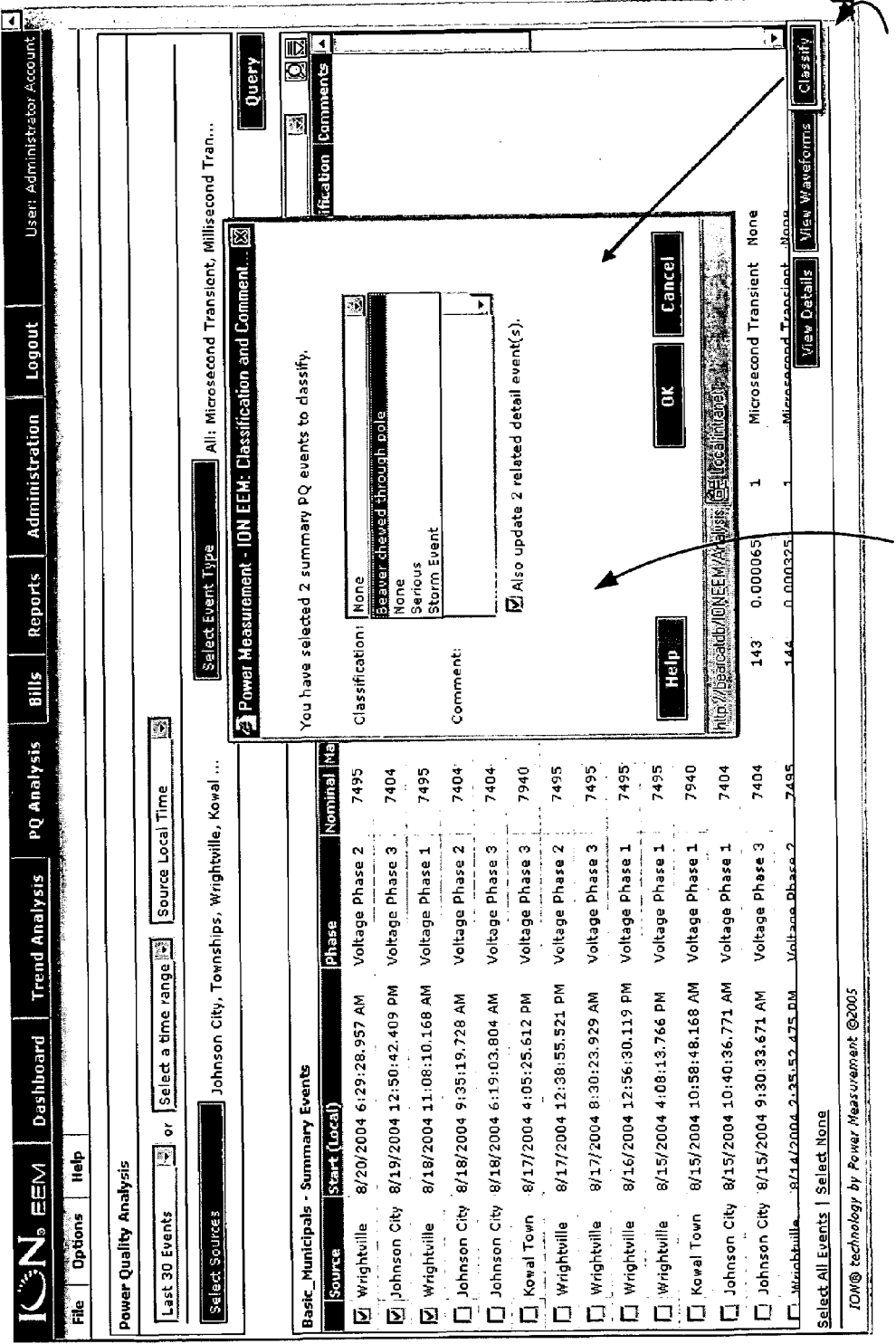
FIG. 6 depicts an exemplary screen for classifying data outputted by the disclosed embodiments.

FIG. 3b shows an event summary window with a list generated by the power quality analysis system based on user inputs. In the exemplary scenario depicted in this figure, the user has selected a Table view from the drop-down menu 304, and the events corresponding to the criteria that the user selected are displayed in a table format. The event summary window 306 displays events in a list format. From any of the viewing formats that may be selected from the drop-down menu 304, the user has the choice to select all or a subset of the events. The event summary window 306 of FIG. 3b shows a view details button 320, a view waveforms button 322, and classify and comment button 324. These buttons represent further windows that are displayed. FIG. 4 shows an alternate embodiment in which the user selects the view waveforms button 322. FIGS. 5a and 5b show an alternate embodiment in which the user actuates the view details button 320. FIG. 6 shows an alternate embodiment based on actuation of the classify and comment button 324 (also referred to as the classify button 324).

FIG. 4 shows an exemplary waveform viewer screen 400 outputted by the disclosed embodiments. The waveform view screen 400 is triggered by the actuation of the view waveforms button 322 in FIG. 3b. A waveform explorer window 402 allows the user to select sources, events, and phases that they wish to see waveforms for. A waveform viewer window 404 displays the actual waveform. The waveform explorer window 402 displays various options for waveforms to be displayed and the waveform viewer window 404 displays the waveforms based on those options. The waveform represents an analysis of the power quality parameter values. In this particular embodiment, the voltage is shown as a function of time, however, the waveform explorer allows for other energy parameters to be shown other than voltage such as current, resistance, impedance, inductance, etc.

FIG. 5a shows an alternate exemplary screen displaying power quality events as outputted by the disclosed embodiments similar to FIGS. 3a and 3b, but with further details. In this figure, the user has actuated the view details button 320, causing a view detail window 506 to be displayed. The view detail window 506 displays events related to the one or more characteristic (aggregated) events selected in the event summary window 306. The view detail window 506 offers similar options to the user as the event summary window 306 in FIG. 3a. The user may view the output in various forms, as can be seen in a drop-down menu 504, such as Table, Chart, and so forth. In this case the user has selected the chart view, and the details of the selected power quality events are displayed in a chart in the view detail window 506 of the screen 200. A chart control window 508 of the screen 200 allows the user to manipulate how the detailed events are to appear on the chart displayed in the view detail window 506. Events are differentiated by colors and symbols to allow the user to more easily identify patterns in their power quality events. A color group menu 514 and a symbol group menu 512 allow the user to select which power quality parameter values, power quality event properties, non-power quality properties or time properties of the events they want to sort by. Furthermore, a drop-down menu chart overlay 510 allows the user to select a chart overlay over which events will appear.

FIG. 5b shows an alternate exemplary screen displaying power quality events as outputted by the disclosed embodiments with details as in FIG. 5a, but shown in chart format. Like in FIG. 5a, the user has actuated the view details button 320, causing the view detail window 506 to be displayed. In this figure, the summary events window 306 is displayed as a chart rather than as a list like in FIG. 5a. The user has selected 'Day of Week' from the symbol group drop-down menu 312 in the chart control 308, and in the event summary window 306 it can be seen that each day of the week has a different symbol associated with it. Furthermore, the user has selected 'Phase' from the color group drop-down menu 310, and in the event summary window 306 each phase has a different color. The user may click on one or more events to select them, and the details of those events will be shown in the view detail window 506. Furthermore, in the chart control window 508, the user has again selected 'Day of Week' from the symbol group drop-down menu 512 in chart control 508, and in the Event Detail window 506 only the symbol for 'Friday' is shown, as only one event has been selected to show details for, and it occurred on a Friday.

FIG. 6 shows an alternate exemplary screen for classifying data outputted by the disclosed embodiments in the screen 200. In this figure, the user has selected the classify and comment button 324 (shown as just classify in FIG. 6) from FIG. 3b, causing a classify window 600 to be displayed. The classify window 600 allows the user to assign a classification to one or more selected events. Later, the user may perform a query for events with the same classification or comment, and all events with a particular classification or comment may be displayed. Furthermore the user may add a comment which will be attached to the event and may be searched on, as was described previously. Alternatively, the classification of power quality events may be performed automatically by the Power Quality Analysis Module 108. In one embodiment, the user can configure a customizable classification scheme by setting up parameters (such as magnitude, duration and so forth) for each type of event they want to classify. Now the classification scheme automatically classifies all events based on these preset parameters. Alternatively, automatic classification may be performed by the Power Quality Analysis Module 108 using pattern recognition; neural networks and so forth. This allows for creating a new cause based on unmeasured trends in the data. The Power Quality Analysis Module 108 may consult with a library of previously classified events to classify a current event. For example, each time a power quality event is classified, the Power Quality Analysis Module 108 may send the related data to a central database that can be shared by multiple Power Quality Analysis Modules 108 at different locations. Over time the library will build up enough data to be able to quickly identify the cause of a power quality event.

Figure 7:
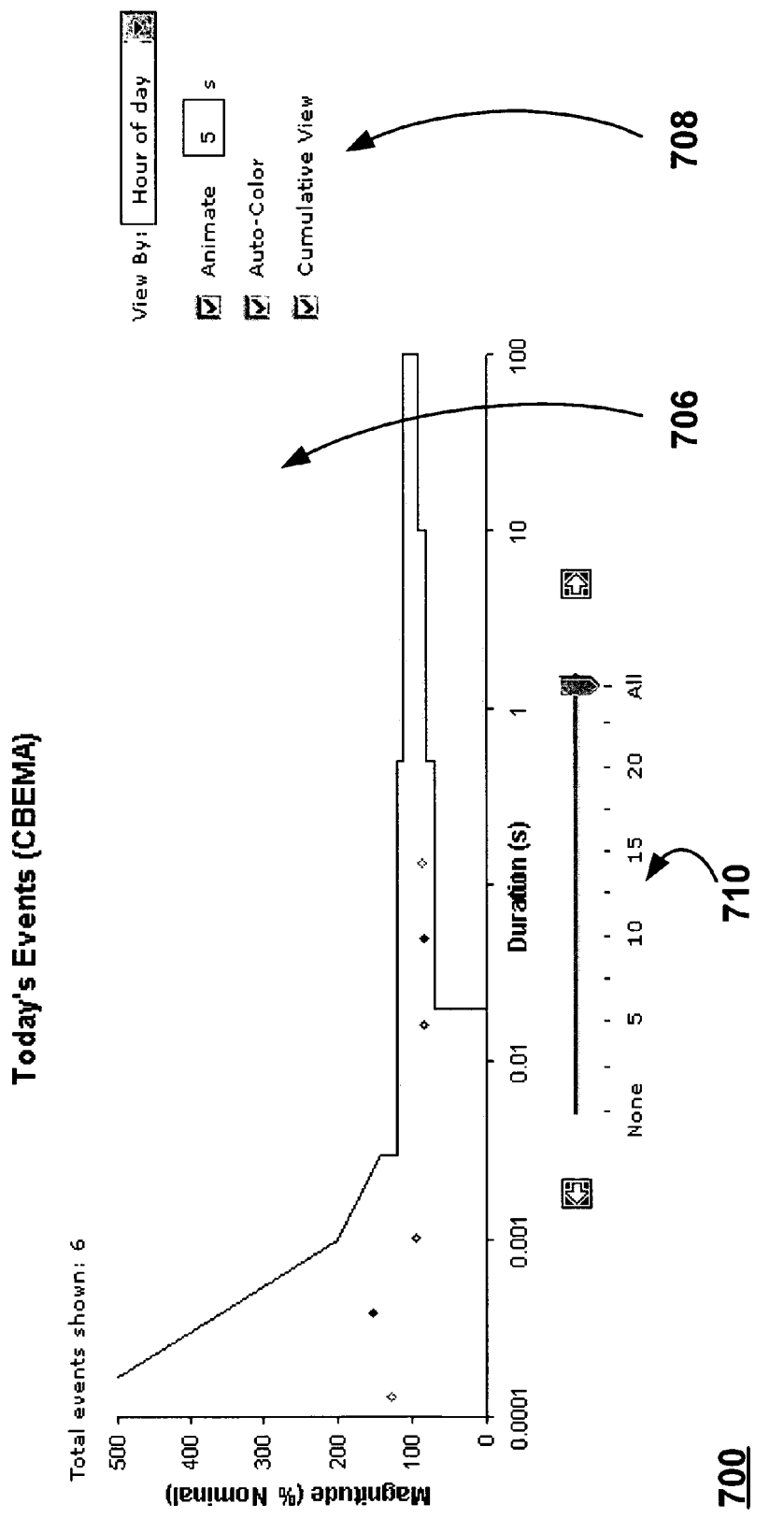
FIG. 7 depicts an exemplary screen display showing power quality over time outputted by the disclosed embodiments.

FIG. 7 shows an exemplary screen 700 of power quality over time outputted by the disclosed embodiments. A chart 706 displays a number of power quality events with a CBEMA overlay. The chart 706 is detailed representation of the chart windows 306 and 506 shown in FIGS. 3a, 5a and 5b. In FIG. 3a, the user has the option of selecting a CBEMA overlay in the chart overlay drop-down menu 314. FIG. 7 shows an exemplary chart 700 created with a CBEMA overalay. A chart control 708 allows the user to adjust the appearance of the chart. The chart control 708 has a View By field, and check boxes for Animate, Auto-color and Cumulative View. The View By field indicates the granularity with which time is broken down. The maximum value would be limited by the overall time range of the data shown. The minimum value would be limited to the resolution of the data. The selected time breakdown is shown on the control slider 710. Here, the overall time range of the chart is one day. The user has selected 'Hour of Day' as the breakdown to explore. The control slider 710 therefore displays hours 0-24 in abbreviated form. The Animate check box, when enabled, will bring the visualization to life. The system will step through the visualization over the total duration specified in the field next to the check box. This allows the user to see a condensed time view of the events as they occurred, essentially the events will 'blossom' over the animation cycle. The Auto-Color feature, when enabled, will assign a different color to each event depending on which time group it falls under. For example, if the user selects the time dimension 'Off/On Peak' in the View By drop-down then the system would color events occurring on-peak and off-peak differently. Where 'Hour of Day' is selected in the View By drop-down, events are colored based on what hour of the day they occurred in. A time slider 710 allows the user to explore the time sequence of the events displayed on the chart. When the time slider 710 is positioned at the 'None' position, no events are shown (this could be considered the start of the time sequence). Similarly, 'All' is the end of the sequence and all events are shown. By moving the slider, the user will be able to display either only events occurring at the selected time index or the cumulative sum of events until that point (as indicated by the cumulative view checkbox in the chart control 708). The arrow buttons to the left and right of the slider allow the user to step through the event sequence. The chart 706 may have various different appearances. For example, the chart 706 may be a map of a city. Measuring devices all over the city may be logging power quality events. The time slider 710 allows the user to select the time period they would like to see events for. Depending on what time period is chosen, the map lights up with events for that time period.

FIG. 8 shows an exemplary chart of trends in power quality outputted by the disclosed embodiments. The chart 800 may be displayed in the display windows 306 or 506 as shown in FIGS. 3*a* and 5*a*. This chart 800 allows a user to easily see the relationships or trends between different data dimensions by depicting the relationship between humidity and count of sags over a 10 hour period. However, instead of humidity the user might choose any non-power quality property, such as demand, production unit or temperature. Instead of count of sags, the user might choose any power quality event property, such as frequency, magnitude, duration and so forth. Instead of hours, they might choose any time property such as weekly, monthly and so forth. Although they are not depicted in the chart 800, the user still will have access to similar filtering and querying capabilities 202-220 as described earlier. Alternately, similar techniques might be used to create models or predictions of what might happen if the values for some dimension change. For example, the chart 800 may show how many sags there would be if the humidity goes up by an average of 10% over the average for the time period in question.

It is therefore intended that the foregoing detailed description be regarded as illustrative rather than limiting, and that it be understood that it is the following claims, including all equivalents, that are intended to define the spirit and scope of this invention.

We claim:

1. A power management architecture for monitoring power quality events in a power distribution system, said architecture comprising:

a first data source coupled with at least a portion of said power distribution system, the power distribution system being characterized by at least one power quality parameter, wherein said first data source is operative to determine at least one value of said at least one power quality parameter;

a second data source coupled with said first data source, wherein said second data source is operative to evaluate said at least one power quality parameter value and determine at least one power quality event property, said at least one power quality event property being derived at least indirectly from said at least one power quality parameter value and identifying at least one of the power quality events;

a third data source operative to provide at least one non-power quality property, wherein said at least one non-power quality property is not measured, sampled, or derived from said power distribution system; and a power quality analysis module coupled with said first data source, said second data source, and said third data source, said power quality analysis module comprising a processor operative to compute power quality information based on said at least one power quality parameter value, said at least one power quality event property, and said at least one non-power quality property.

2. The power management architecture of claim 1, wherein said power quality information comprises a relationship between said at least one power quality parameter value, said at least one power quality event property and said at least one non-power quality property.

3. The power management architecture of claim 1, wherein said at least one power quality parameter comprises at least one of voltage, current, resistance, impedance, inductance, frequency, phase or combinations thereof.

4. The power management architecture of claim 1, wherein said processor is further operative to compute said power quality information based on at least one time property wherein said at least one time property is at least one of said at least one non-power quality property or said at least one power quality event property, or combinations thereof.

5. The power management architecture of claim 1, further comprising a fourth data source comprising at least two of said first data source, said second data source, said third data source, or combinations thereof, said power quality analysis module being further coupled with said fourth data source.

6. The power management architecture of claim 1, wherein said power quality analysis module is coupled with at least one of said first data source, said second data source, said third data source, or combinations thereof via a digital network.

7. The power management architecture of claim 1, wherein at least one of said first data source, said second data source, said third data source, or combinations thereof, comprises another power management architecture.

8. The power management architecture of claim 7, wherein said at least one power quality parameter value is generated by said another power management architecture.

9. The power management architecture of claim 1, wherein said power quality analysis module further comprises a display operative to display at least one of said at least one power quality parameter value, said at least one power quality event property, said at least one non-power quality property, said power quality information or combinations thereof.

10. The power management architecture of claim 9, wherein said display of said power quality information comprises actionable data represented by symbols or colors.

11. The power management architecture of claim 9, wherein said display of said power quality information comprises an animation over time of said power quality information.

12. The power management architecture of claim 9, wherein said display of said power quality information comprises a visualization of said at least one power quality parameter value.

13. The power management architecture of claim 9, wherein said display of said power quality information comprises at least one of a summary or detail view.

14. The power management architecture of claim 1 wherein at least one of said first data source, said second data source, said third data source, or combinations thereof, comprises a data storage device operative to store at least one of said at least one power quality parameter value, said at least one power quality event property, said at least one non-power quality property, said power quality information, or combinations thereof.

15. The power management architecture of claim 1, wherein said first data source, comprises at least one intelligent electrical device (IED) operative to measure said at least one power quality parameter value from said power distribution system.

16. The power management architecture of claim 1, wherein said at least one non-power quality property comprises at least one of operational properties, financial properties, or combinations thereof.

17. The power management architecture of claim 16, wherein said operational properties comprises at least one of source of energy, temperature, humidity, voltage level, full load current, power factor, demand, energy, feeder, measuring device type, communications type, type of equipment, production units, shift, production run, manager of an area, cost center, floor/zone/row/rack, square footage, occupancy, geography, or combinations thereof.

18. The power management architecture of claim 1, wherein said processor is further operative to classify said at least one power quality parameter value.

19. The power management architecture of claim 18, wherein said classification of said at least one power quality parameter value allows for searching of said power quality events.

20. The power management architecture of claim 18, wherein said classification of said at least one power quality parameter value allows for data mining of said power quality events.

21. The power management architecture of claim 18, wherein said classification of said at least one power quality parameter value is capable of being customized by at least one user specified parameter for each type of said power quality events.

22. The power management architecture of claim 18, wherein said classification of said at least one power quality parameter value is based on a library of causes of said power quality events.

23. The power management architecture of claim 1, wherein said processor is further operative to allow a query of said at least one power quality parameter value based on most recent said power quality events.

24. The power management architecture of claim 1, wherein said processor is further operative to allow a query of said at least one power quality parameter value based on a comment field in said power quality information.

25. The power management architecture of claim 1, wherein said processor is further operative to calculate trends in said at least one power quality parameter value.

26. The power management architecture of claim 1, wherein said processor is further operative to associate a cost with said power quality events.

27. A power quality analysis device comprising:
an input module operative to receive a value of at least one power quality parameter, at least one non-power quality property, and at least one power quality event property, wherein said value of said at least one power quality parameter is measured, sampled or derived from at least a portion of a power distribution system, said at least one non-power quality property not being measured, sampled or derived from said power distribution system;
a processor coupled to said input module and operative to generate power quality information based on said value of said at least one power quality parameter value, said at least one non-power quality property, and said at least one power quality event property; and
an output module coupled to said processor and operative to provide said power quality information.

28. The power quality analysis device of claim 27, wherein said processor is further operative to compute said power quality information based on at least one time property, wherein said at least one time property is at least one of said at least one non-power quality property or said at least one power quality event property, or combinations thereof.

29. The power quality analysis device of claim 27, further comprising a display operative to display at least one of said values of said at least one power quality parameter, said at least one power quality event property, said at least one non-power quality property, said power quality information or combinations thereof.

30. The power quality analysis device of claim 27 wherein said input module further comprises a data storage device operative to store at least one ef said value of said at least one power quality parameter, said at least one power quality event property, said at least one non-power quality property, said power quality information, or combinations thereof.

31. The power quality analysis device of claim 27, wherein said input module further comprises at least one intelligent electrical device (IED), wherein said at least one IED is operative to measure said value of said at least one power quality parameter from a power distribution system.

32. The power quality analysis device of claim 27, wherein said at least one non-power quality property comprises operational properties or financial properties.

33. The power quality analysis device of claim 27, wherein said processor is further operative to create a classification of said value of said at least one power quality parameter.

34. The power quality analysis device of claim 33, wherein said classification of said value of said at least one power quality parameter is operative to be customized by at least one user specified parameter for each type of power quality event.

35. The power quality analysis device of claim 27, wherein said processor is further operative to associate a cost with a power quality event.

36. The power quality analysis device of claim 27, wherein at least one of said value of said at least one power quality parameter, at least one non-power quality property, at least one power quality event property, power quality information, or combinations thereof is communicated over a digital network.

37. The power quality analysis device of claim 27 wherein said module comprises another power quality analysis device.

38. A method for generating power quality information to measure power quality events comprising:
measuring at least one power quality parameter value of at least a portion of a power distribution system;
receiving at least one non-power quality property and at least one power quality event property, wherein said at least one power quality event property comprises an identification of at least one of the power quality events, further wherein said non-power quality property is not measured, sampled, or derived from said power distribution system;

evaluating, with a processor, said at least one power quality parameter value, said at least one of said non-power quality property, and said at least one power quality event property to produce said power quality information; and providing said power quality information.

39. The method of claim 38, wherein said evaluating of said power quality information includes evaluating time properties wherein said time properties are at least one of said at least one non-power quality property, or said at least one power quality event property, or a combination thereof.

40. The method of claim 38, wherein said providing said power quality information comprises providing said power quality information based on the time of a power quality event.

41. The method of claim 38, wherein said providing said power quality information comprises providing said power quality information based on the type of a power quality event.

42. The method of claim 38, wherein said providing said power quality information comprises providing said power quality information based on the cost of a power quality event.

* * * * *

UNITED STATES PATENT AND TRADEMARK OFFICE
CERTIFICATE OF CORRECTION

PATENT NO. : 7,369,950 B2  Page 1 of 1
APPLICATION NO. : 11/113728
DATED : May 6, 2008
INVENTOR(S) : Douglas S. Ransom It is certified that error appears in the above-identified patent and that said Letters Patent is hereby corrected as shown below:

In the Claims

In column 20, in claim 30, line 26, after "to store at least one" delete "ef".

In column 20, in claim 37, line 2, before "module comprises another power" insert --input--.

Signed and Sealed this

Sixteenth Day of December, 2008

JON W. DUDAS
*Director of the United States Patent and Trademark Office*